(12) United States Patent
Niikawa

(10) Patent No.: US 7,075,569 B2
(45) Date of Patent: Jul. 11, 2006

(54) IMAGE PROCESSING APPARATUS FOR PERFORMING SHADING CORRECTION ON SYNTHESIZED IMAGES

(75) Inventor: Masahito Niikawa, Sakai (JP)

(73) Assignee: Minolta Co., Ltd., Osaka (JP)

( * ) Notice: Subject to any disclaimer, the term of this patent is extended or adjusted under 35 U.S.C. 154(b) by 944 days.

(21) Appl. No.: 10/102,146

(22) Filed: Mar. 19, 2002

(65) Prior Publication Data

US 2002/0135688 A1    Sep. 26, 2002

(30) Foreign Application Priority Data

Mar. 26, 2001    (JP) ............................... 2001-088015

(51) Int. Cl.
H04N 5/225 (2006.01)
H04N 9/64 (2006.01)
H04N 5/21 (2006.01)
G06K 9/40 (2006.01)
G06K 9/36 (2006.01)

(52) U.S. Cl. .................. 348/218.1; 348/251; 348/615; 382/274; 382/284

(58) Field of Classification Search ............. 348/218.1, 348/229.1, 251, 362, 615; 382/274, 284, 382/295

See application file for complete search history.

(56) References Cited

U.S. PATENT DOCUMENTS

| | | | |
|---|---|---|---|
| 5,162,914 A | 11/1992 | Takahashi et al. | 358/213.19 |
| 5,402,171 A | 3/1995 | Tagami et al. | 348/219 |
| 5,576,562 A * | 11/1996 | Konuma | 348/615 |
| 5,982,951 A * | 11/1999 | Katayama et al. | 382/284 |
| 6,097,430 A * | 8/2000 | Komiya et al. | 348/218.1 |
| 6,243,103 B1 * | 6/2001 | Takiguchi et al. | 382/284 |
| 6,744,471 B1 * | 6/2004 | Kakinuma et al. | 348/218.1 |
| 6,833,862 B1 * | 12/2004 | Li | 348/207.99 |
| 6,963,674 B1 * | 11/2005 | Shiomi | 382/312 |
| 2001/0033701 A1 * | 10/2001 | Okisu et al. | 382/284 |
| 2003/0133019 A1 * | 7/2003 | Higurashi et al. | 348/218.1 |
| 2004/0174445 A1 * | 9/2004 | Kawakami et al. | 348/251 |

FOREIGN PATENT DOCUMENTS

| | | | |
|---|---|---|---|
| JP | 08-172568 A | | 7/1996 |
| JP | 09-261526 A | | 10/1997 |
| JP | 10-108057 A | | 4/1998 |
| JP | 11-168659 A | | 6/1999 |
| JP | 11-284837 A | | 10/1999 |
| JP | 2000-041179 A | | 2/2000 |
| JP | 2000-196953 A | | 7/2000 |
| JP | 2001177738 A | * | 6/2001 |
| JP | 2001274973 A | * | 10/2001 |

* cited by examiner

Primary Examiner—Ngoc-Yen Vu
Assistant Examiner—John M. Villecco
(74) Attorney, Agent, or Firm—Sidley Austin LLP

(57) ABSTRACT

A digital camera which is an image processing apparatus is controlled so that a first image and a second image are acquired for the same subject in different timings. A plurality of correction tables for use in shading correction are prepared in advance in a shading ROM of the digital camera. When a first image and a second image are acquired, multiplication of one correction table is performed on both images by a shading correction circuit. As a result of this, a shading correction is effected on both images. The first image and the second image that have been subjected to the shading correction are taken into respective image memories, and after being subjected to a positioning process by a general controller, they are synthesized to generate a synthesized image.

21 Claims, 27 Drawing Sheets

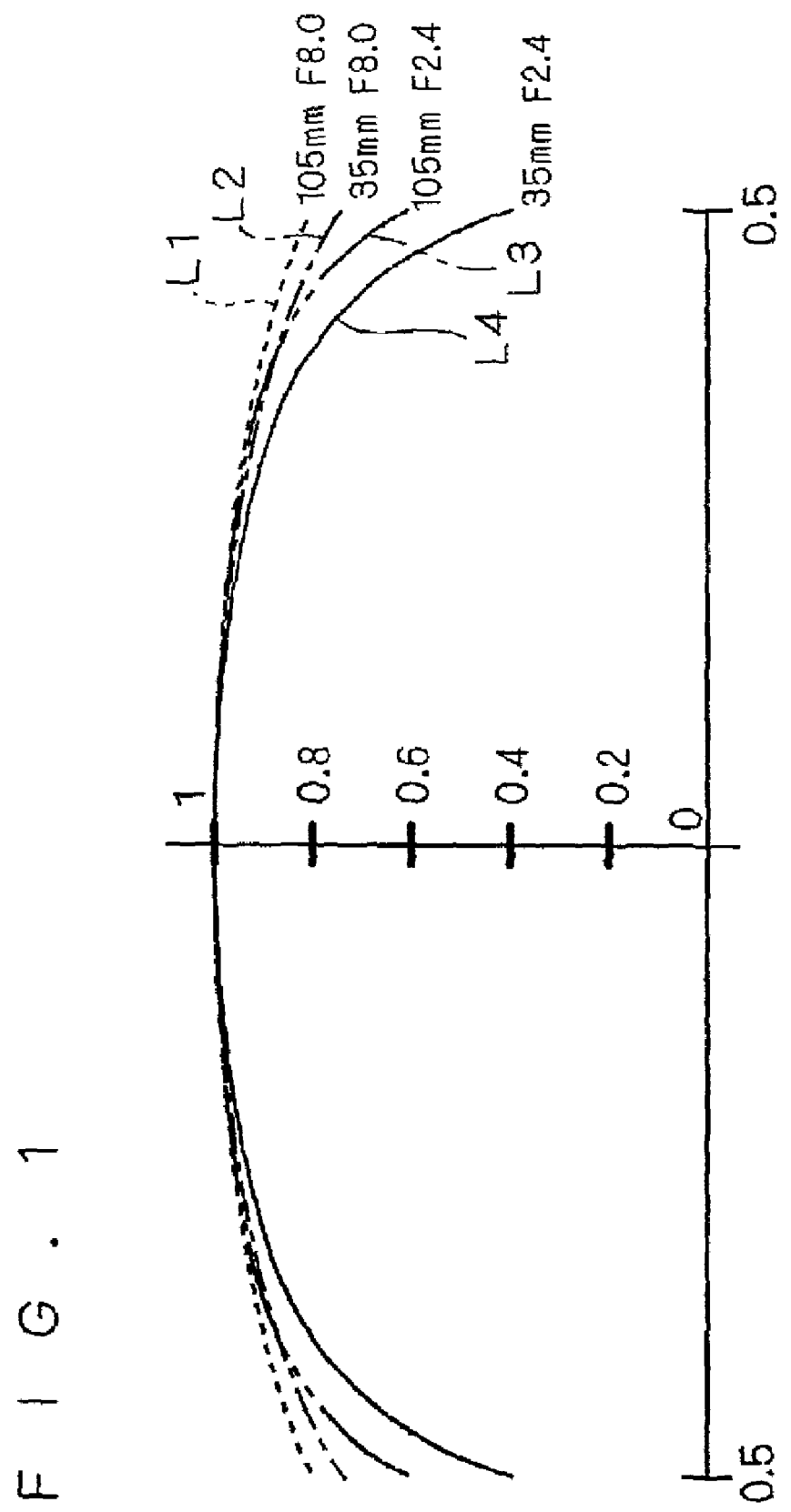

F I G . 7
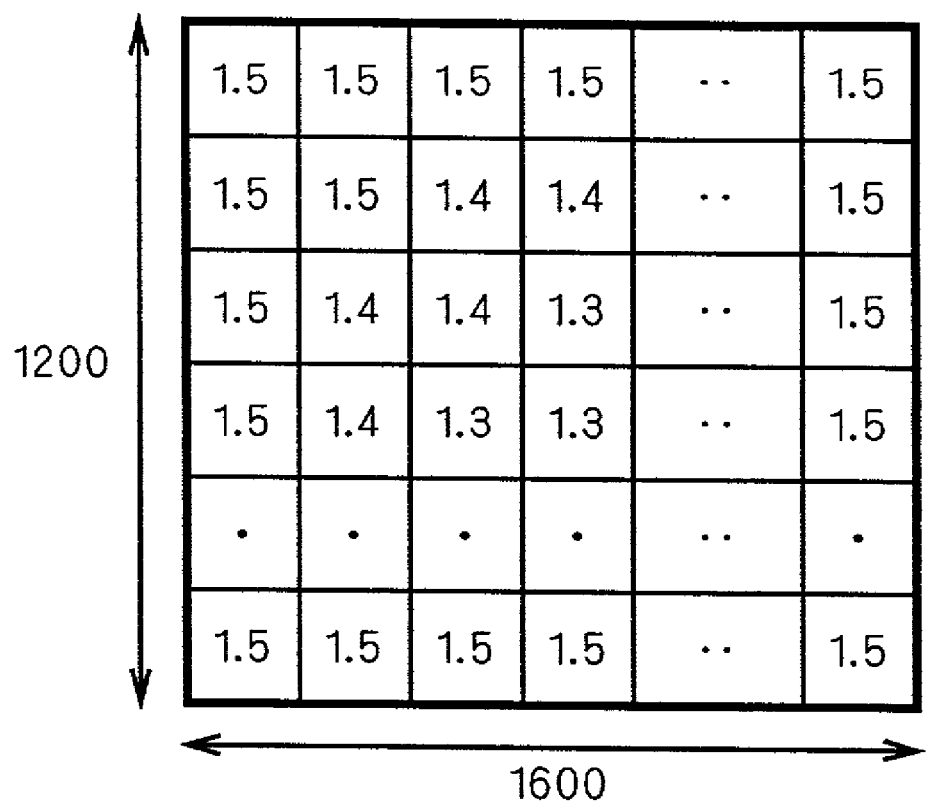

FIG. 8

CAMERA NAME : CAMERA A
LENS NAME : ××××
EXPOSURE FOCAL LENGTH : 15mm
EXPOSURE F NO : 4.0
EXPOSURE MODE : GRADATION CONTROL MODE
FOCAL POINT : ∞
FILE NAME : P00001.RAW
SUBJECT BRIGHTNESS : 2.0lux
WHITE BALANCE : R1000G2000B1200
EXPOSURE DATE : 2001/01/01

| TAG INFORMATION | CAPTURED IMAGE DATA (HIGH RESOLUTION DATA) | THUMBNAIL IMAGE |

INDEX
FIRST FRAME
SECOND FRAME
THIRD FRAME
nTH FRAME
230TH FRAME

F I G . 1 1
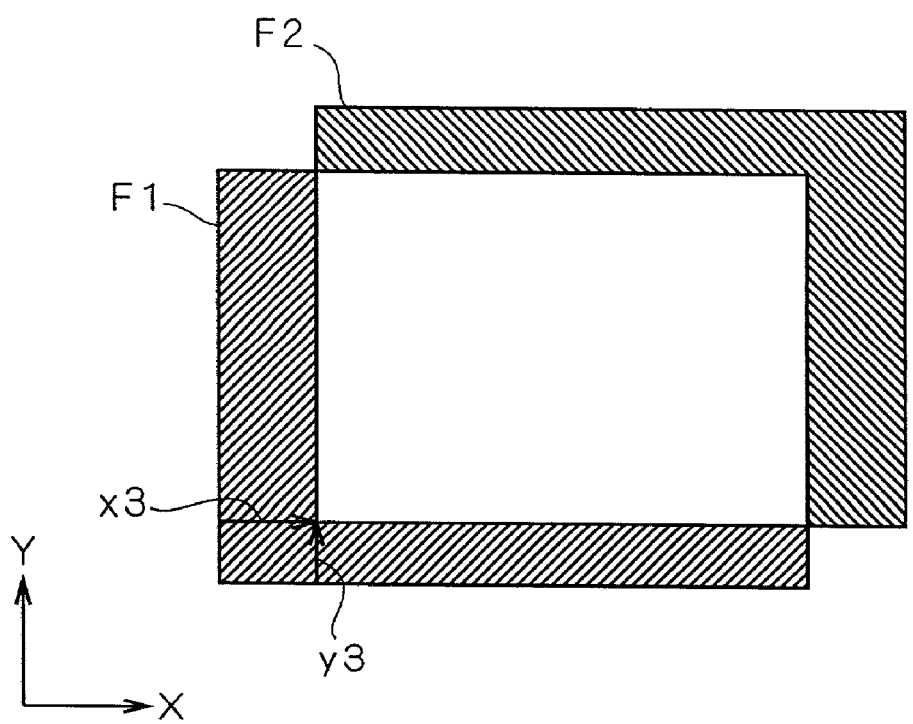

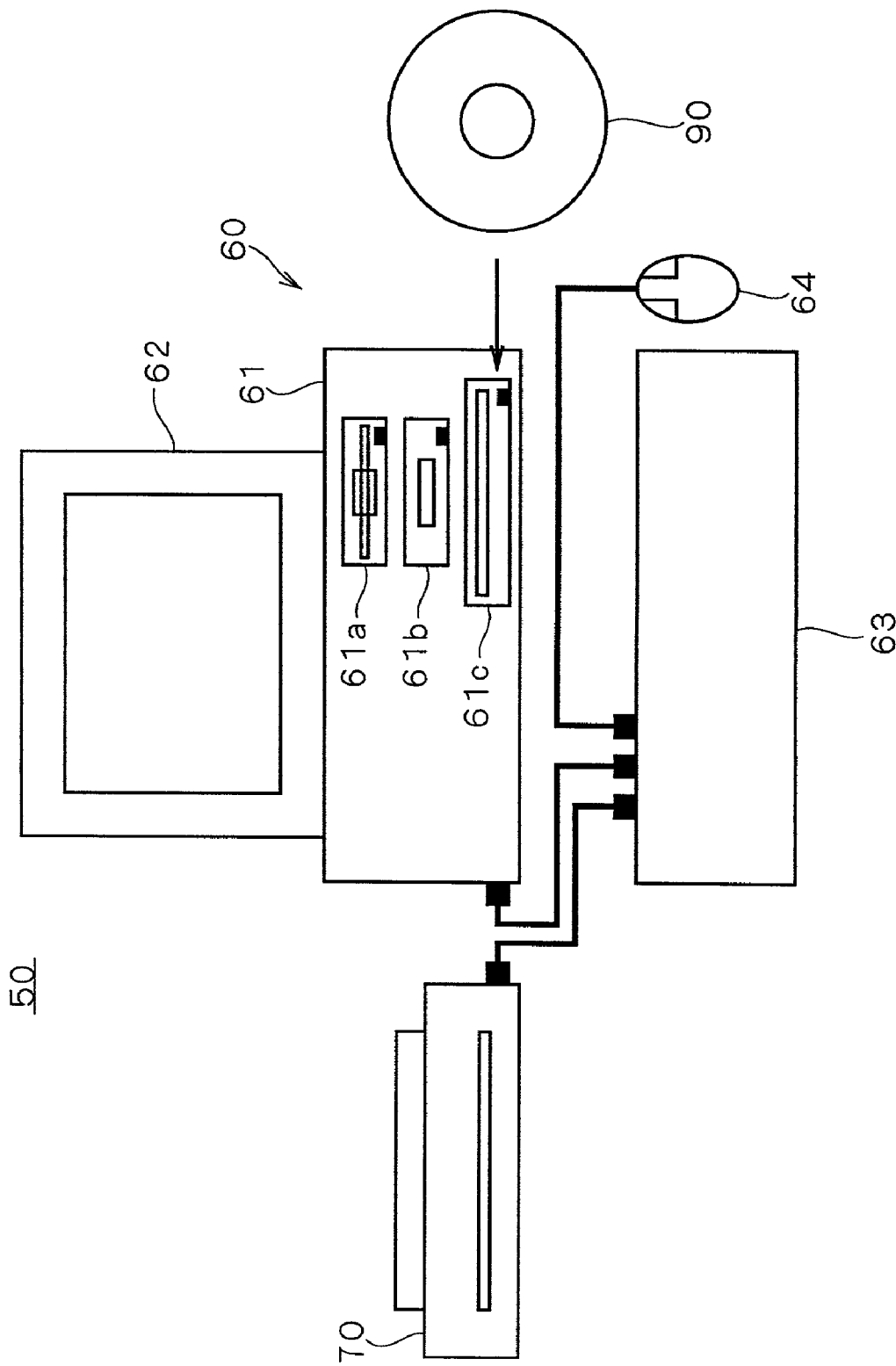

F I G . 2 8 A
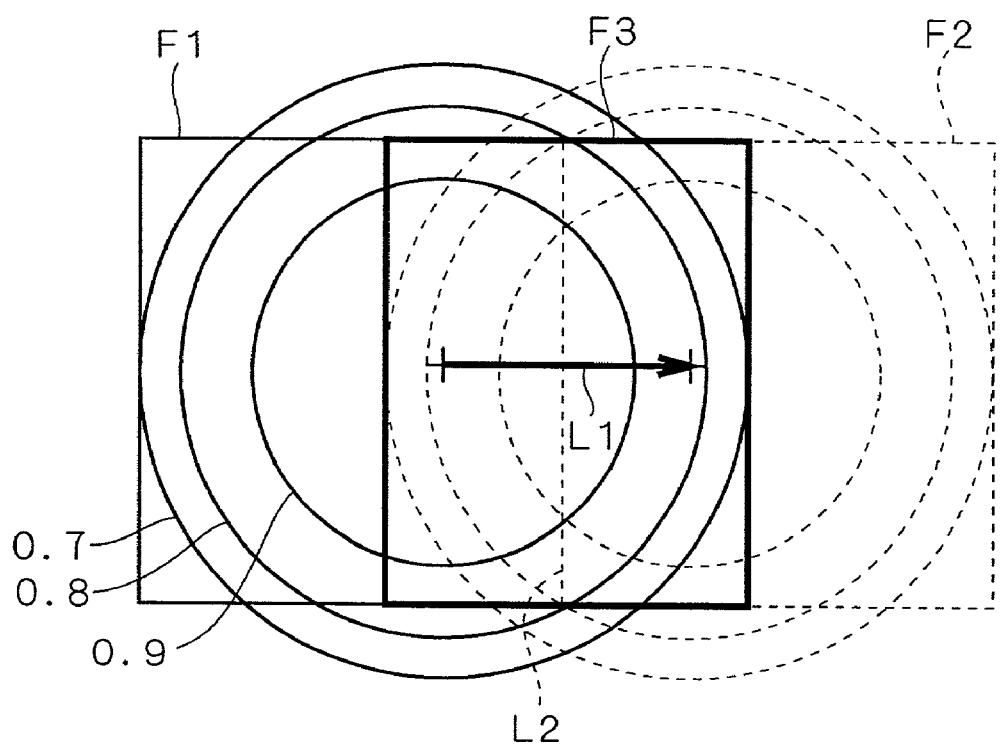
F I G . 2 8 B
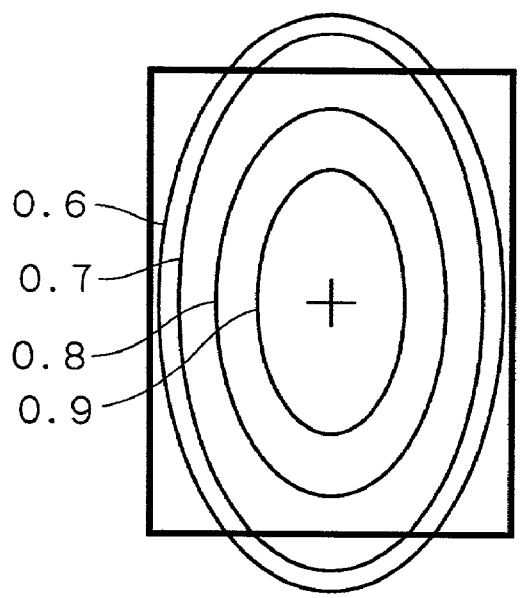

IMAGE PROCESSING APPARATUS FOR PERFORMING SHADING CORRECTION ON SYNTHESIZED IMAGES

This application is based on application No. 2001-088015 filed in Japan, the contents of which are hereby incorporated by reference.

BACKGROUND OF THE INVENTION

1. Field of the Invention

The present invention relates to an image processing technique for obtaining a synthesized image having improved image quality and graphic effect by synthesizing two images.

2. Description of the Background Art

Conventionally, there have been proposed image processing techniques wherein using two images of different image qualities that have been captured for the same subject, an image having improved image quality and graphic effect compared to the original images is synthesized.

As one example according to the conventional art, a technique for correcting a blur wherein a plurality of images that have been captured at a shutter speed which is short enough so as not to be influenced by a blur are additively synthesized in accordance with the amount of blur is known.

As another example according to the conventional art, it is known that image data wherein any subjects at different positions are in focus can be obtained by synthesizing image data that has been obtained by capturing images while changing the focus position.

Further, U.S. Pat. No. 5,162,914 publication discloses a camera having a substantially widened dynamic range by capturing odd fields and even fields while changing the exposure time and synthesizing unblurred parts of these fields.

Further, U.S. Pat. No. 5,402,171 publication discloses a technique for improving resolution of image by synthesizing an image from image data captured while moving the image pickup device.

Practically, in the case of capturing two images for the same subject with a digital camera or the like, the images are captured at different timings and a small movement of the subject or movement of the camera itself will occur in this time lag of exposure. For this reason, a small difference in position arises between these two captured images.

In the case of synthesizing the above-mentioned two images, it is necessary to carry out positioning on these two images prior to synthesizing the images while taking such a positional difference between these images into consideration. If these images are synthesized without carrying out such positioning accurately, which leads rather deterioration of image.

Furthermore, it is general that when an image is captured via a lens in a digital camera or the like, so-called "shading" that the level of image data decreases with distance from the center of the image to the periphery. However, conventionally, in the case of synthesizing the above-mentioned two images, positioning of images was carried out without taking an influence of shading into account, so that deterioration in image quality resulted due to unsatisfactory positioning between images in some scenes.

SUMMARY OF THE INVENTION

The present invention is directed to an image processing apparatus which synthesizes a plurality of images.

According to the present invention, this image processing apparatus comprises: an image acquiring part for acquiring a first image and a second image; a shading corrector for performing a shading correction on each of the first image and the second image acquired by the image acquiring part; a position adjuster for performing positioning of the first image and the second image that have been subjected to the shading correction by the shading corrector; and an image generator for generating a synthesized image of the first image and the second image that have been subjected to the positioning by the position adjuster.

It is possible to perform accurate positioning while taking an influence of shading into consideration, and hence it is possible to prevent an image quality from deteriorating during the image synthesis process.

According to one aspect of the present invention, the image processing apparatus further comprises: an image memory capable of storing a plurality of images; and a controller for controlling the image memory to store a shading-corrected image that has been subjected to a shading correction by the shading corrector whenever each of the first image and the second image is acquired, wherein the position adjuster performs positioning in response to that either one of the first image and the second image that is acquired later is stored in the image memory as the shading-corrected image.

Since the positioning process is performed in response to that the image captured later from the first image and the second image is stored in the image memory as an image that has been subjected to the shading correction, it is possible to achieve optimization of the process.

According to another aspect of the present invention, the processing apparatus further comprises: an image memory capable of storing a plurality of images; and a controller for controlling the image memory to store each of the first image and the second image acquired in the image acquiring part; wherein the shading corrector performs a shading correction on each of the first image and the second image stored in the image memory.

After the first image and the second image are stored in the image memory, the shading correction is for each of the first image and the second image, with the result that it is possible to reduce the interval of the exposures for the first image and the second image.

According to yet another aspect of the present invention, the image acquiring part is an image sensor for capturing the first image and the second image for the same subject in different timings.

It is possible to synthesize two images acquired for the same subject in different timings while taking an influence of shading into consideration.

Also the present invention is directed to a program product containing a program for executing an image processing.

Therefore, it is an object of the present invention to make it possible to synthesize two images with high accuracy in consideration of an influence of shading.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a view showing an example of an influence by shading in an image.

FIG. 7 is a view showing one example of a correction table used for a shading correction.

FIG. 8 is a view showing a recording method of an image file to a memory card.

FIG. 11 is a view showing movement of an image in a positioning process.

FIG. 18 is an appearance view showing a configuration of an image processing apparatus according to the fourth preferred embodiment.

FIG. 23 is a view showing a processing procedure of a gradation control program.

FIGS. 28A and 28B are views showing curves each having a constant distribution of correction coefficients used for shading correction in captured image data and a synthesized image.

DESCRIPTION OF THE PREFERRED EMBODIMENTS

Figure 2:
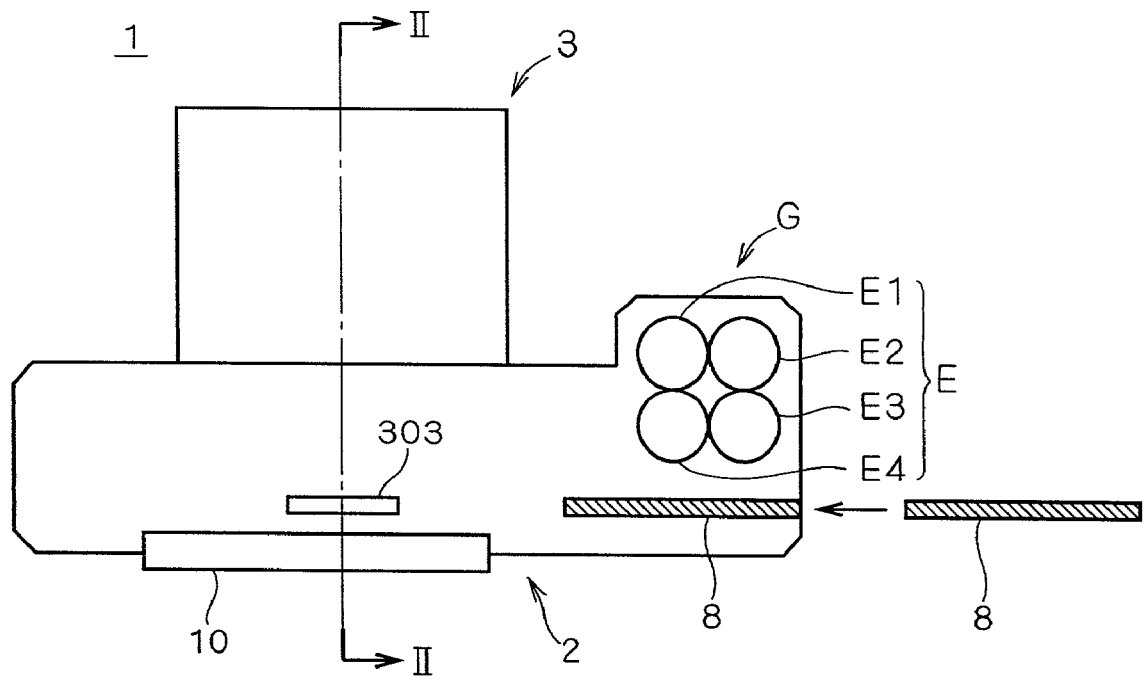
FIG. 2 is a plan view showing an image processing apparatus according to a preferred embodiment of the present invention.

Before explaining concrete configurations and operations of the preferred embodiments of the present invention, the background of the present invention will be explained by way of a concrete example.

When a subject is photographed by using an image pickup device such as CCD in an image processing apparatus such as digital camera equipped with an imaging lens, a phenomenon that the level of image data decreases with the distance from the center of the image to the periphery, so-called "shading" occurs.

FIG. 1 is a view showing an example of an influence of shading on an image captured by means of a certain digital camera. The image depicted in FIG. 1 is such that all the pixels constituting the image receive incident light from the subject of the uniform brightness. The horizontal axis represents distance from the optical axis of each image data, in a relative distance with the distance of diagonal line of the image being 1. That is, the center point of the image which is image data of the optical axis is the origin point. The vertical axis represents level of each image data, in a relative value with the level of image data of the optical axis being 1. It is contemplated that this relative value represents a decrease rate of level of image data due to shading at each pixel position.

The respective curves denoted by the reference numerals L1 to L4 represent decrease rates in level of image data when the focal length and the diaphragm of the imaging lens are changed while using the same digital camera and the same imaging lens. The curve L1 represents the case where the focal length is 105 mm (converted value in a 35 mm film camera) and the f-number is 8.0, the curve L2 represents the case where the focal length is 35 mm and the f-number is 8.0, the curve L3 represents the case where the focal length is 105 mm and the f-number is 2.4, and the line L1 represents the case where the focal length is 35 mm and the f-number is 2.4.

As shown in this drawing, the longer the distance from the center point of the image which is the optical axis to the periphery, the lower the level of image data. That is, the closer to the periphery the image data exists, the more the image is likely to be influenced by shading (larger decrease rate of level).

Furthermore, in the case of using the same digital camera and the same imaging lens, the influence of shading varies with the focal length and the amount of exposure light. As shown in the drawing, the shorter the focal length (wide side), the larger the influence of shading (influence range and decrease rate of level), whereas the longer the focal length (tele side), the smaller the influence of shading. Furthermore, in the same manner, the larger the amount of exposure light, the larger the influence of shading, whereas the smaller the amount of exposure light, the smaller the influence of shading. As can be seen in the drawing, the smaller the f-number (the smaller the f-stop number of diaphragm), the larger the influence of shading, whereas the larger the f-number (the larger the f-stop number of diaphragm), the smaller the influence of shading.

By the way, when a subject is photographed by a digital camera or the like, a phenomenon sometimes occurs that light portions in the subject image are too white, while dark portions in the subject image are too black. This phenomenon results from a narrow dynamic range of a general image pickup device and causes deterioration in image quality. For eliminating such a phenomenon, it has been supposed that an image whose dynamic range is substantially widened is generated by capturing two images of different exposures for the same subject in different timings and synthesizing them to conduct a gradation control process.

In the case of capturing two images in different timings for obtaining a synthesized image, a small difference in position occurs between these two images thus captured because of the difference in timing. For this reason, in synthesizing two images, it is necessary to effect positioning for these two images prior to synthesizing the images while taking such a positional difference between these images into consideration. However, it is impossible to effect accurate positioning without taking such an influence of shading as described above into consideration. In preferred embodiments as will be described below, the above-mentioned influence of shading is taken into consideration when effecting the positioning on such two images.

In the following, preferred embodiments of the present invention will be explained in detail while referring to the attached drawings.

1. FIRST PREFERRED EMBODIMENT

Figure 3:
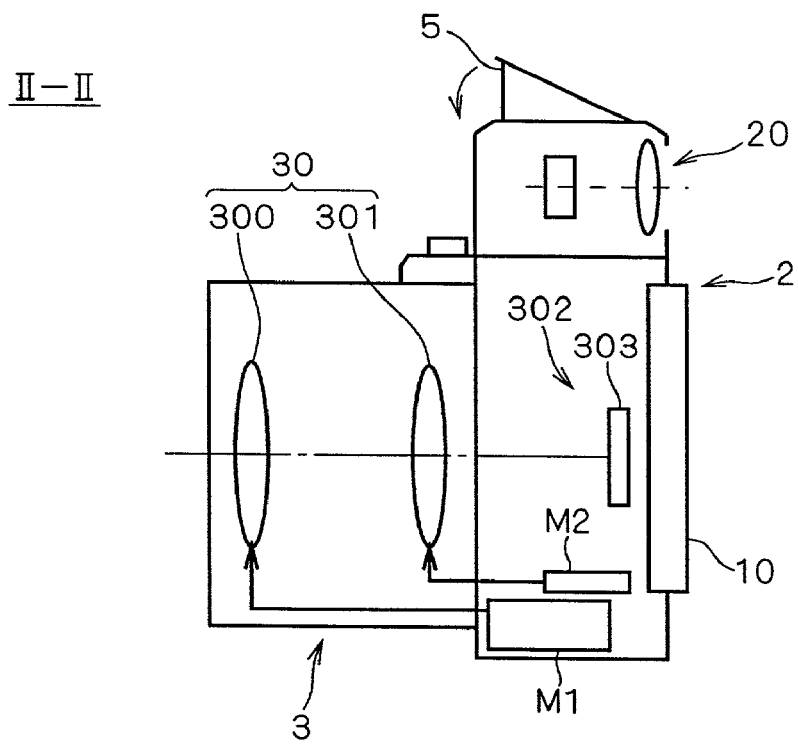
FIG. 3 is a section view showing an image processing apparatus according to the preferred embodiment of the present invention.
Figure 4:
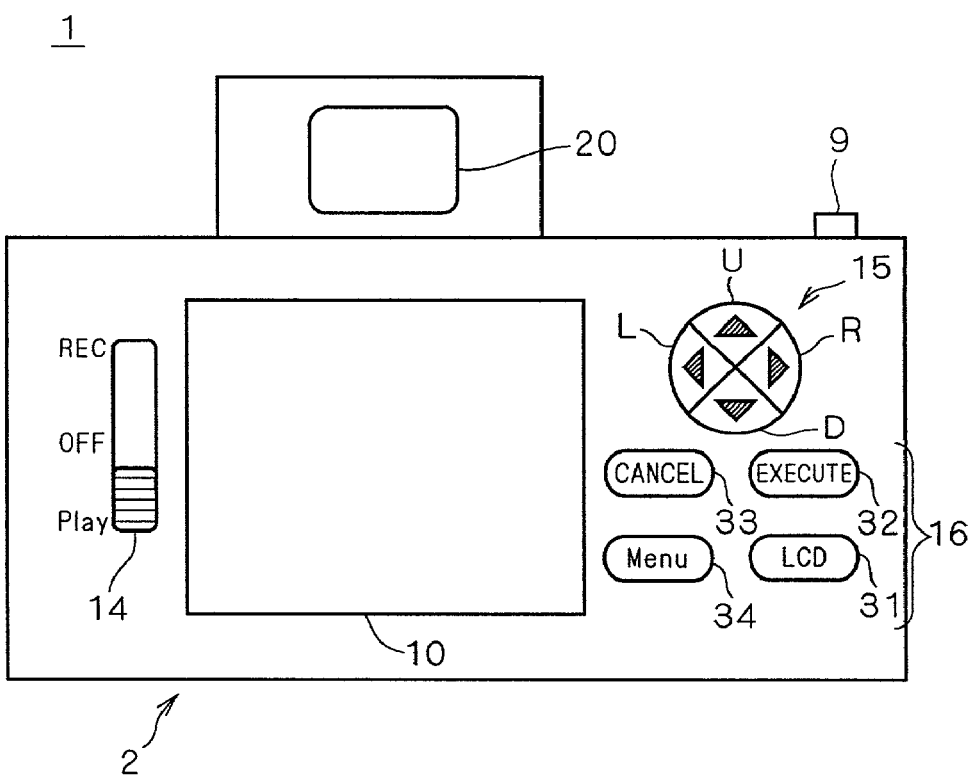
FIG. 4 is a front view showing an image processing apparatus according to the preferred embodiment of the present invention.

FIGS. 2 to 4 show schematic configurations of an appearance of a digital camera 1 which is an image processing apparatus according to the first preferred embodiment of the present invention. FIG. 2 is a plan view of the digital camera 1, FIG. 3 is a cross section view viewed from the position II—II of FIG. 2, and FIG. 4 is a rear view of the digital camera 1.

As shown in these drawings, the digital camera 1 comprises a camera main body 2 which is a nearly rectangular parallelepiped and an imaging lens 3 which is detachably attached to the camera main body 2. As shown in FIG. 2, the digital camera 1 is adapted to detachably accommodate a memory card 8 for recording a captured image. The digital camera 1 uses a power battery E in which four AA cells E1 to E4 are serially connected as a driving source.

As shown in FIG. 3, the imaging lens 3 which is a zoom lens having a macro function comprises a lens group 30 including a zoom lens 300 and a focus lens 301. On the other hand, inside the camera main body 2 are provided a zoom motor M1 for changing the zoom ratio of the zoom lens 300 and a focus motor M2 for driving the focus lens 301 to achieve focusing. Also, behind the lens group 30 of the imaging lens 3 is provided a color image pickup device 303 at an appropriate position. The color image pickup device 303 is configured by a single-sheet type color area sensor in which colors filters of R(red), G(green) and B(blue) are bonded in a checker on the surface of each pixel of the area sensor formed of a CCD. The color image pickup device (hereinafter, referred to as "CCD") 30 has, for example, a total of 1,920,000 pixels of 1,600 pixels in the horizontal direction and 1,200 pixels in the vertical direction.

On the front surface of the camera main body 2 is provided a grip portion G as shown in FIG. 2, and at an appropriate position of the upper end of the camera main body 2 is provided an integrated flash of hop-up type. Further, as shown in FIG. 4, a shutter button 9 is provided on the top surface of the camera main body 2. The shutter button 9 has a function of detecting and discriminating a half-pressed state (S1) to be used as a trigger for focus adjustment and a full-pressed state (S2) to be used as a trigger for exposure for recording.

On the other hand, the rear surface of the camera main body 2 is provided with an electronic viewfinder (hereinafter, referred to as "EVF") 20 and a liquid crystal display (hereinafter, referred to as "LCD") 10. In contrast with the case of the optical finder, the EVF 20 and the LCD 10 serve as a finder for performing a live view display of an image signal from the CCD 303 in the image standby state.

Also the LCD 10 can display a menu screen for setting an exposure mode, an imaging condition or the like in the recording mode and reproducing and displaying a captured image recorded on the memory card 8 in the playback mode.

In the left part on the rear surface of the camera main body 2 is provided a power switch 14. This power switch 14 also serves as a mode setting switch for switching the mode between a recording mode (mode for executing photographing) and a playback mode (mode for reproducing a recorded image on the LCD 10). To be more specific, the power switch is formed of a three-position slide switch wherein when the contact is slid to the center "OFF" position, the power is turned off, when the contact is slid to the upper "REC" position, the power is turned on and the recording mode is effected, and when the contact is slid to the lower "PLAY" position, the power is turned on and the playback mode is effected.

In the light part on the rear surface of the camera main body 2 is provided a four-gang switch 15. The four-gang switch 15 has a circular operational button which enables various operations to be made by pressing buttons U, D, L and R provided in the right, left, upward and downward directions in this operational button. For example, this four-gang switch 15 serves as a switch for changing the item selected on the menu screen displayed on the LCD 10 and for changing the frame to be reproduced which is selected on an index screen. Furthermore, the left and right buttons L, R serve as switches for changing the zoom ratio in the recording mode. When the right switch R is pressed down, the zoom lens 300 continuously moves to the wide side being driven by the zoom motor M1 and when the left switch L is pressed down, the zoom lens 300 continuously moved to the tele side by being driven by the zoom motor M1.

Also, below the four-gang switch 15 is provided a switch group 16 including a cancel switch 33, an execute switch 32, a menu display switch 34, a LCD display switch 31 and the like. The cancel switch 33 is a switch for canceling the content that has been selected on the menu screen. The execute switch 32 is a switch for confirming or executing the content that has been selected on the menu screen. The menu display switch 34 is a switch for displaying a menu screen on the LCD 10 or changing the contents of the menu screen. The LCD display switch 31 is an ON/OFF changeover switch of the display on the LCD 10.

A user can open the menu screen for selection of exposure mode and select an exposure mode by operating the four-gang switch 15, the switch group 16 and the like. The exposure mode includes a normal exposure mode in which an exposure is made one by one in the usual manner and a gradation control processing mode. The gradation control processing mode refers to a mode intended for obtaining a synthesized image with substantially widened dynamic range by capturing two images having different exposures for the same subject in different timings, and synthesizing these images in an appropriate adding ratio. A single operation of the shutter button 9 triggers two exposures while changing the exposure condition so as to obtain two images.

Figure 5:
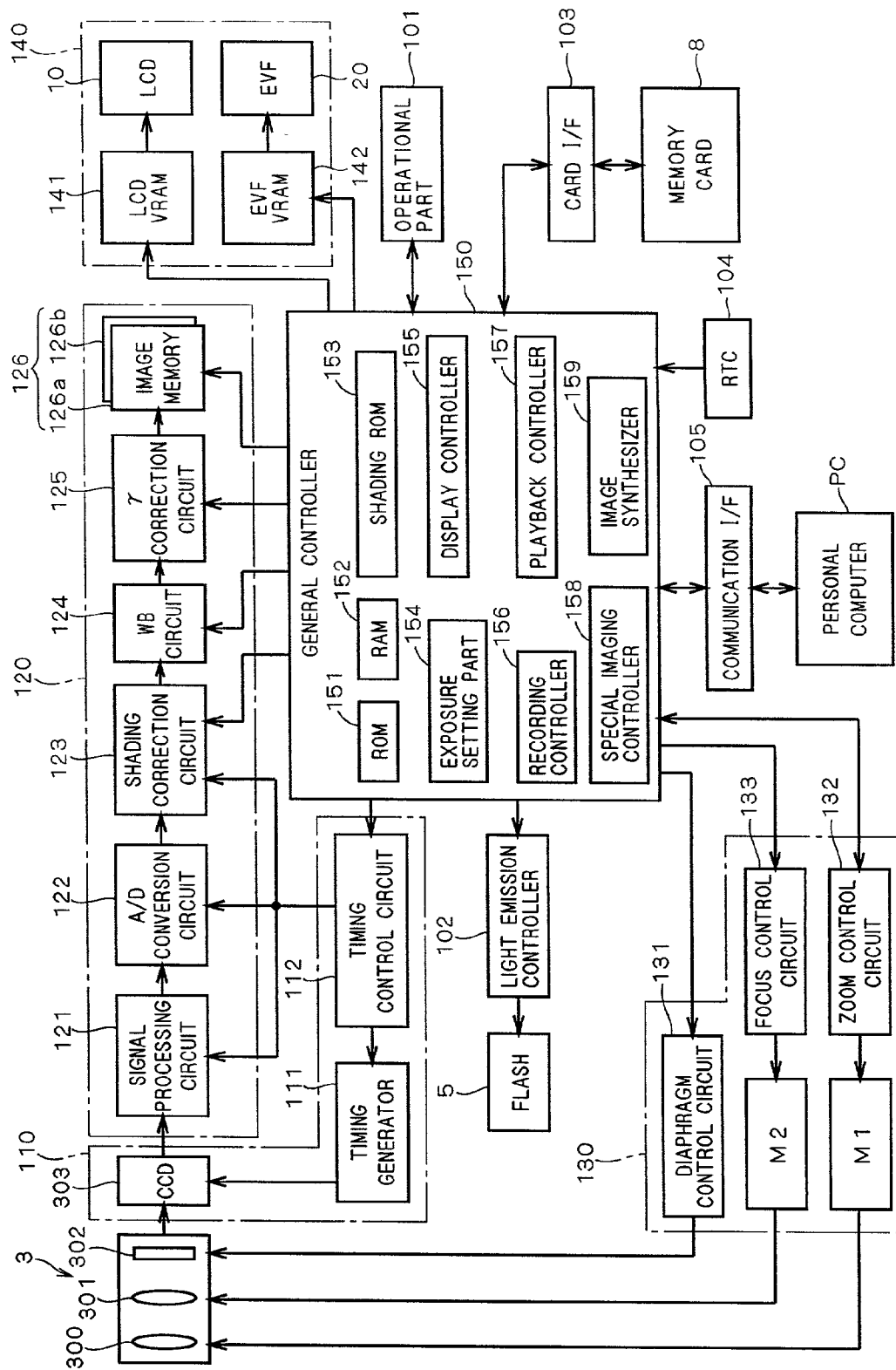
FIG. 5 is a block diagram showing a functional configuration of an image processing apparatus according to the first preferred embodiment.

Next, an internal configuration of the digital camera 1 will be explained. FIG. 5 is a schematic block diagram showing an internal configuration of the digital camera 1.

The imaging lens 3 has therein a diaphragm 302 for adjusting an amount of light transmission, as well as the zoom lens 300 and the focus lens 301.

An image capturer 110 photoelectrically converts a subject light source entered via the imaging lens 3 into an image signal and captures the image signal, and is provided with a timing generator 111 and a timing control circuit 112 as well as the CCD 303. The CCD 303 receives the light of the subject light source for a predetermined exposure time based on a drive control signal inputted from the timing generator 111 to convert it to an image signal, and outputs the image signal to a signal processor 120 by using a readout control signal inputted from the timing generator. At this time, the image signal is outputted to the signal processor 120 while being divided into each of the color components R, G and B.

The timing generator 111 generates a drive control signal on the basis of a control signal inputted from the timing control circuit 112, as well as generates a readout signal on the basis of a reference clock to output it to the CCD 303. The timing control circuit 112 controls the imaging operation of the image capturer 110. The timing control circuit 112 generates an imaging control signal on the basis of a control signal inputted from a general controller 150. Examples of the imaging control signal include a control signal for photographing a subject, a reference clock, a timing control signal (synchronous clock) for processing an image signal outputted from the CCD 303 at the signal processor 120. The timing control signal is inputted to a signal processing circuit 121, an A/D conversion circuit 122, a shading correction circuit 123 and the like in the signal processor 120.

The signal processor 120 executes a predetermined analogue signal processing and digital signal processing with respect to an image signal outputted from the CCD 303. The signal processing of image signal is executed for every light reception signal of each pixel constituting the image data. The signal processor 120 has the signal processing circuit 121, the A/D conversion circuit 122, the shading correction circuit 123, an WB circuit 124, a γ correction circuit 125 and an image memory 126.

The signal processing circuit 121 is designed to execute analogue signal processing, mainly configured by a CDS (correlation double sampling) circuit and an AGC (auto gain control) circuit, and serves to reduce the sampling noise and adjust the signal level for the image signal outputted from the CCD 303. The gain control in the AGC circuit includes the case where a level shortage of the captured image is compensated when a correct exposure is not obtained by the f-number of the diaphragm 302 and the exposure time of the CCD 303.

The A/D conversion circuit 122 is designed to convert an image signal which is an analogue signal outputted from the signal processing circuit 121 to image data which is a digital signal. The A/D conversion circuit 122 converts image signals received by the respective pixels into, for example, digital signals of 10 bits to render image data having gradation values of 0 to 1023.

Figure 6:
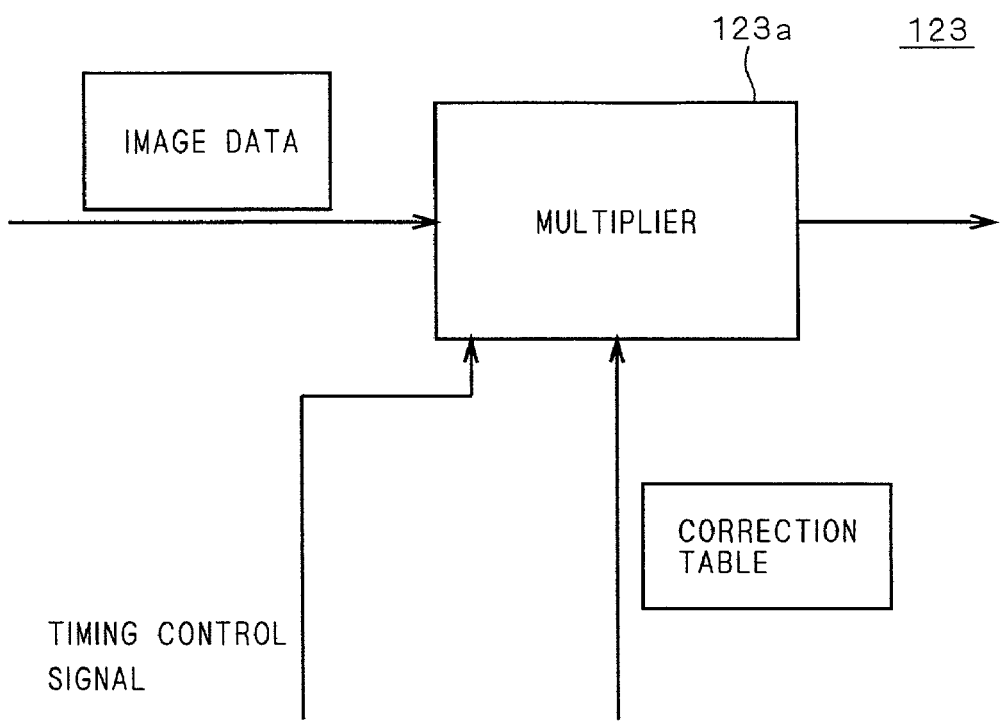
FIG. 6 is a view showing a coefficient processing hardware circuit for performing a shading correction.

The shading correction circuit 123 corrects a shading due to optical system with respect to the image data that has been subjected to A/D conversion. The shading correction circuit has a multiplier 123*a* as shown in FIG. 6, and receives a timing control signal inputted from the timing control circuit 112 and performs multiplication of image data converted in the A/D conversion circuit 122 and a correction table inputted from the general controller 150.

FIG. 7 is a view showing one example of the correction table. As shown in FIG. 7, the correction table has 1,920,000 correction coefficients (actually, inverses of correction coefficients) for corresponding to the respective 1,920,000 pixels of 1,600 pixels×1,200 pixels of the CCD 303. Each correction coefficient corresponds to the rate of decrease in level of each pixel data shown in FIG. 1, and the inverse of the correction coefficient is held in the correction table in advance. When each pixel shown in the curve of FIG. 1 is multiplied by the inverse of the correction coefficient, the curve is converted to a straight line in which the levels of image data are constantly 1. That is, by subjecting every pixel data to the multiplication by the inverse of the correction coefficient (coefficient process), the shading can be corrected. In the case where overflow occurs in this multiplication process, the level of the image data is set at the maximum value of 1023.

A plurality of correction tables for different parameters which are the optical conditions such as focal length and f-number at the time of imaging are prepared and stored in a shading ROM 153 provided in the general controller 150. The general controller 150 performs selection of correction table from the shading ROM 153 in accordance with the optical condition such as focal length and f-number at the time of imaging. Therefore, the shading correction circuit 123 can perform a shading correction in accordance with the optical condition.

In the above correction table, since the correction coefficients are set for every pixel, the data size is enormous. For this reason, for example, it is also possible to set one correction data for each block unit of 4 pixels×4 pixels and perform correction for each pixel block. Furthermore, it is also possible to set a correction data of each block unit as a reference value of the block, and determine a correction coefficient of each pixel by weights of reference values of the block to which the object pixel belongs and the peripheral blocks with the position (distance) of the pixel. In this case, it is possible to reduce the data size of the correction table to 1/16 in comparison with the case where correction coefficients are prepared for every pixel.

Referring again to FIG. 5, the WB circuit 124 adjusts a white balance of captured image. The WB circuit 124 adjusts a white balance of captured image by converting the level of image data of each color component R, G, B with the use of a level conversion table inputted from the general controller 150. The γ correction circuit 125 corrects a γ characteristic of image data. The γ correction circuit 125 corrects the level of each image data using the γ correction table which is preliminarily set.

The image memory 126 is a memory for temporarily storing image data for which image processing has been completed. The image memory 126 has two memory areas, concretely a first memory 126*a* and a second memory 126*b* so as to be capable of storing image data of two frames. The first memory 126*a* and the second memory 126*b* each have a memory capacity capable of storing image data of one frame. In the present preferred embodiment, since the number of pixels is 1,920,000, each of them has a capacity that can store image data of 1,920,000 pixels.

A light emission controller 102 controls light emission of the flash 5 on the basis of a light emission control signal inputted from the general controller 150. The light emission control signal includes an indication for making preparation for light emission, a light emission timing and an amount of light emission.

A lens controller 130 controls drivings of the zoom lens 300, the focus lens 301 and the diaphragm 302 in the imaging lens 3. The lens controller 130 has a diaphragm control circuit 131 for controlling an f-number of the diaphragm 302, a zoom control circuit 132 for controlling driving of the zoom motor M1 and a focus control circuit 133 for controlling driving of the focus motor M2.

On the basis of an f-number inputted from the general controller 150, the diaphragm control circuit 131 drives the diaphragm 302 and sets the amount of aperture at that f-number. The focus control circuit 133 controls the amount of drive of the focus motor M2 on the basis of an AF control signal inputted from the general controller 150 and sets the focus lens 301 at the in-focus position. The zoom control circuit 132 drives the zoom motor M1 on the basis of the zoom control signal inputted from the general controller 150 and causes the zoom lens 300 to move in the direction designated by the four-gang switch 15.

A display part 140 achieves display on the LCD 10 and the EVF 20. The display part 140 has a LCD VRAM 141 serving as a buffer memory for image data to be reproduced and displayed on the LCD 10 and an EVF VRAM 142 serving as a buffer memory for image data to be reproduced and displayed on the EVF 20, as well as the LCD 10 and the EVF 20.

In the imaging standby state, each image data of images taken every 1/30 (sec.) by the CCD 303 is temporarily stored in the image memory 126 after being subjected to a predetermined signal processing by the signal processor 120. Then, the image data is read out by the general controller 150, transferred to the LCD VRAM 141 and the EVF VRAM 142 after being subjected to data size adjustment, and displayed on the LCD 10 and the EVF 20 in the form of a live view display. This allows the user to visually recognize the subject image. On the other hand, in the playback mode, an image read out from the memory card 8 is transferred to the LCD VRAM 141 after being subjected to a predetermined signal processing by the general controller 150 to be reproduced and displayed on the LCD 10.

An RTC 104 is a clock circuit for controlling the date and time of exposure. The date and time of exposure thus obtained is stored in the memory card 8 while being associated with the captured image data.

An operational part 101 inputs operational information from the above-mentioned operational members relating to exposure and playback provided on the camera main body 2 to the general controller 150. The operational information inputted from the operational part 101 includes operational information of each operational member such as shutter button 9, power switch 14, four-gang switch 15 and switch group 16.

The general controller 150 is implemented by a microcomputer and performs centralized control of the exposure function and playback function. The general controller 150 is connected with the memory card 8 via a card interface 103. Also a personal computer PC is externally connected via a communication interface 105.

The general controller 150 has a ROM 151 which stores processing programs for executing a variety of concrete processings in the exposure function and the playback function and control programs for controlling drivings of the above-mentioned members of the digital camera 1, and a RAM 152 which is a work area for executing a number of operations in accordance with the processing programs and the control programs. Also, it is so configured that program data recorded on a memory card 8 which is a recording medium can be read out via the card interface 103 to be stored in the ROM 151. Therefore, these processing programs and control programs can be installed into the digital camera 1 from the memory card 8. The processing programs and the control programs may be installed from the personal computer PC via the communication interface 105.

In FIG. 5, an exposure setting part 154, a display controller 155, a recording controller 156, a playback controller 157, a special imaging controller 158 and an image synthesizer 159 represent functions implemented by the processing programs of the general controller 150 in the forms of functional blocks.

The exposure setting part 154 for executing an exposure control process and determines a brightness of the subject using image data of G color component of the live view image and calculates an exposure control value based on the determination result.

The display controller 155 for executing an image display process performs the above-mentioned display operation of the display part 140, that is, it performs an operation of reading image data temporarily stored in the image memory 126 and transferring the image data to the LCD VRAM 141 or the EVF VRAM 142 after adjusting the image size to adapt to the image size of the display destination as is necessary.

The recording controller 156 executes a recording process. In the normal exposure mode, the recording controller 156 reads out the image data that has been temporarily stored in the image memory 126 after an instruction for exposure is made, and performs predetermined processes based on the JPEG system such as two-dimensional DCT conversion and Huffman coding to generate image data for use recording as captured image data. Furthermore, a thumbnail image is generated by reading out the image data every 8 pixels in each of the vertical and the horizontal directions from the image memory 126 to the RAM 152. Moreover, tag information relating to the captured image data which to be recorded in association with these captured image data is generated. Then, the recording controller 156 generates an image file in which tag information is attached to compressed captured image and thumbnail image, and records the image file onto the memory card 8. In the case where two images are captured in the gradation control processing mode, the same recording process as described above is performed on the synthesized image having subjected to synthesis process by the image synthesizer 159.

FIG. 8 is a view showing a recording method of image file onto the memory card 8. In the top recording area of the memory card, an index area for storing folder information and information of image files belonging to the respective folder is provided, and in subsequently areas, image files are sequentially stored in the order of being captured. The recording area of each image file in the memory card 8 is composed of three areas and tag information, captured image data and thumbnail image are sequentially stored in these three areas from upstream. As shown in the drawing, the tag information includes a camera name, a lens name, a focal length at the time of exposure, an f-number at the time of exposure, an exposure mode, a focal position, a file name, a subject brightness, a white balance adjustment value and a date and time of exposure. The imaging mode represents information whether the image is captured in the normal exposure mode or in the gradation control processing mode.

The playback controller 157 performs reproducing process of a captured image recorded on the memory card 8 on the LCD 10. The playback mode is set by the power switch 14, and then the playback controller 157 reads out thumbnail images from each image file recorded on the memory card 8 and stores them sequentially in the LCD VRAM 141 according to a predetermined index form. As a result of this, thumbnail images are index displayed on the LCD 10. When a thumbnail image to be reproduced is designated from the index displayed thumbnail images by the four-gang switch 15 and the switch group 16, the playback controller 157 reads out the captured image data from the image file and after performing a predetermined elongation process on compressed captured image data, the playback controller 157 transfers it to the LCD VRAM 141 to make the LCD 10 display it.

The special imaging controller 158 controls the exposure operation of the CCD 303 when the shutter button 9 is pressed all the way down (S2) in the condition that the exposure mode is set at the gradation control mode. When the shutter button 9 is brought into the S2 state, for capturing images for synthesis to which the gradation control process is to be effected, the special imaging controller 158 changes the exposure time of the CCD 303 which corresponds to the shutter speed, thereby achieving the control such that exposure operation is repeated twice at a predetermined interval.

The image synthesizer 159 performs a synthesis process of data of two images with different exposure amounts that have been captured in the gradation control processing mode. In this synthesis processes, positioning (positioning process) is performed between two images, and a process for generating an actual synthesized image (image synthesis process) by adding these at an appropriate adding ratio is performed, the detail of which will be described later.

Figure 9:
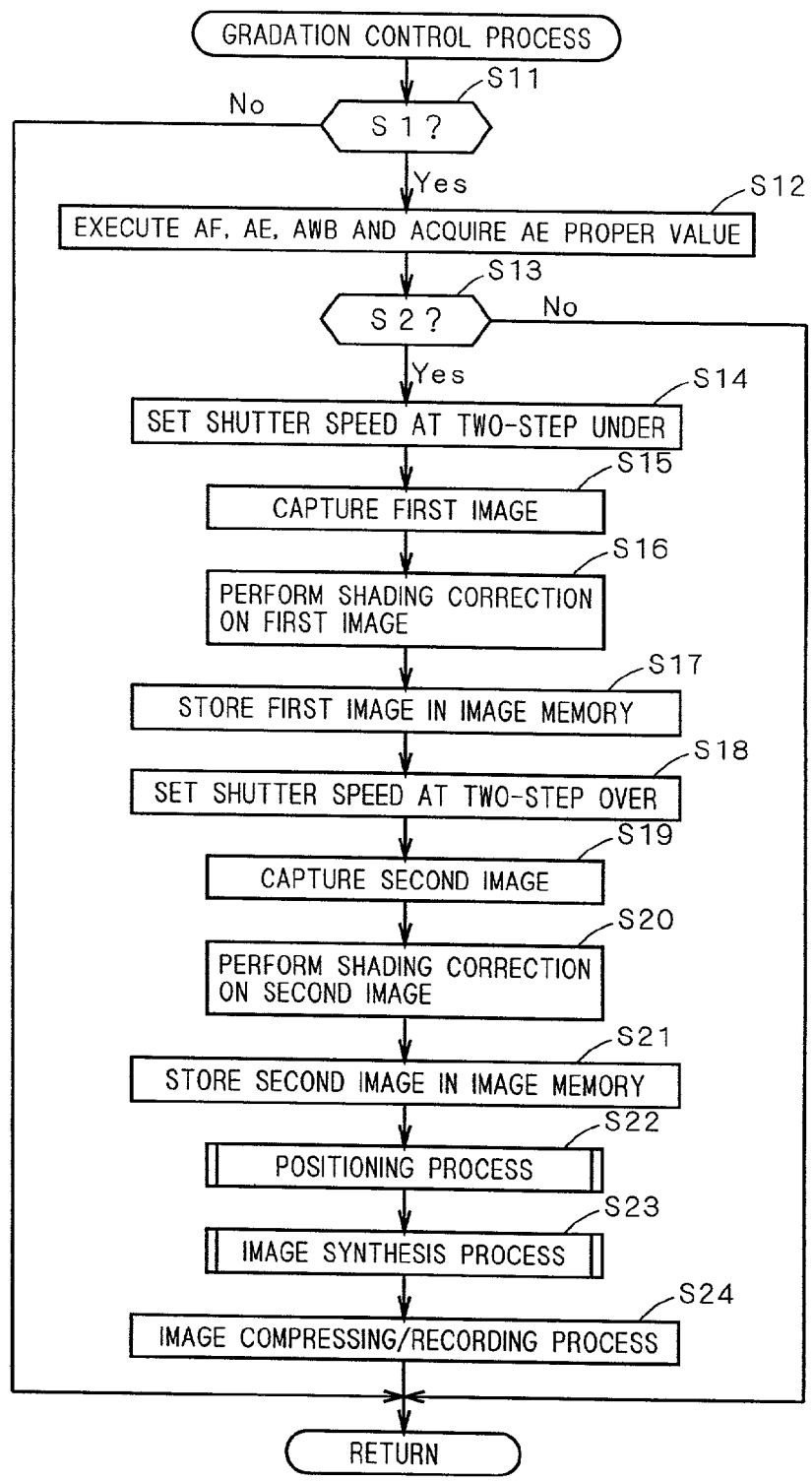
FIG. 9 is a view showing a processing procedure of a gradation control process in the first preferred embodiment.

Next, exposure operation in the gradation control processing mode of the digital camera 1 configured as described above will be explained. FIG. 9 is a flow chart showing a procedure of image capturing operation in the gradation control processing mode.

In step S11, when the shutter button 9 is pressed half way down, a focal point of the lens group 30 of the imaging lens 3 is adjusted for a main subject, an exposure control value is calculated by using a live view image and a white balance adjustment value is set. The exposure control value which is calculated at this time is a value to provide correct exposure, and concretely, a shutter speed and an f-number which are correct values are obtained (step S12).

Next, when the shutter button 9 is pressed all the way down in step S13, the shutter speed is set at a shutter speed which is at two steps under the shutter speed which is a correct value (step S14). Then, the CCD 303 is exposed to the light for an exposure time corresponding to this shutter speed, and thereby a first image F1 of the subject is captured (step S15). After exposure, an image signal outputted from the CCD 303 is subjected to a predetermined analogue signal processing in the signal processing circuit 121, and converted into pixel data of 10 bits in the A/D conversion circuit 122.

Next, in the shading correction circuit 123, correction of shading is executed (step S16). At this time, a correction table which corresponds to the optical conditions of focal length and f-number at the time of exposure is selected and inputted to the shading correction circuit 123 by the general controller 150. The shading correction circuit 123 performs shading correction by executing multiplication process of image data outputted from the A/D conversion circuit 122 and the inputted correction table (see FIG. 6).

After that, predetermined processes are executed by the WB circuit 124 and the γ correction circuit 125, and stored in the first memory 126a of the image memory 126 (step S17). As for this first image F1, since the exposure time of the CCD 303 is set shorter than the proper value, the image is in general dark because of less amount of light exposure compared to images captured in the normal exposure mode. Furthermore, since the shading correction is performed in the shading correction circuit 123, an influence of shading is eliminated.

Next, from the shatter speed which is a proper value, a shutter speed over two steps is set (step S18), and the CCD 303 is exposed to the light for an exposure time corresponding to this shutter speed, and a second image F2 of the subject is captured (step S19). After the exposure, as is the same with the first image F1, an image signal outputted from the CCD 303 is subjected to a predetermined analogue signal processing in the signal processing circuit 121, converted into pixel data of 10 bits in the A/D conversion circuit 122, subjected to a shading correction in the shading correction circuit 123, subjected to predetermined processes in the WB 123 and the γ correction circuit 125, and stored in the second memory 126b of the image memory (steps S20, S21). As for this second image F2, since the exposure time of the CCD 303 is set longer than the proper value, the image is in general light because of the amount of light exposure is larger in comparison with images captured in the normal exposure mode. Furthermore, as is the same with the first image F1, since the shading correction is performed in the shading correction circuit 123, an influence of shading is eliminated.

Figure 10:
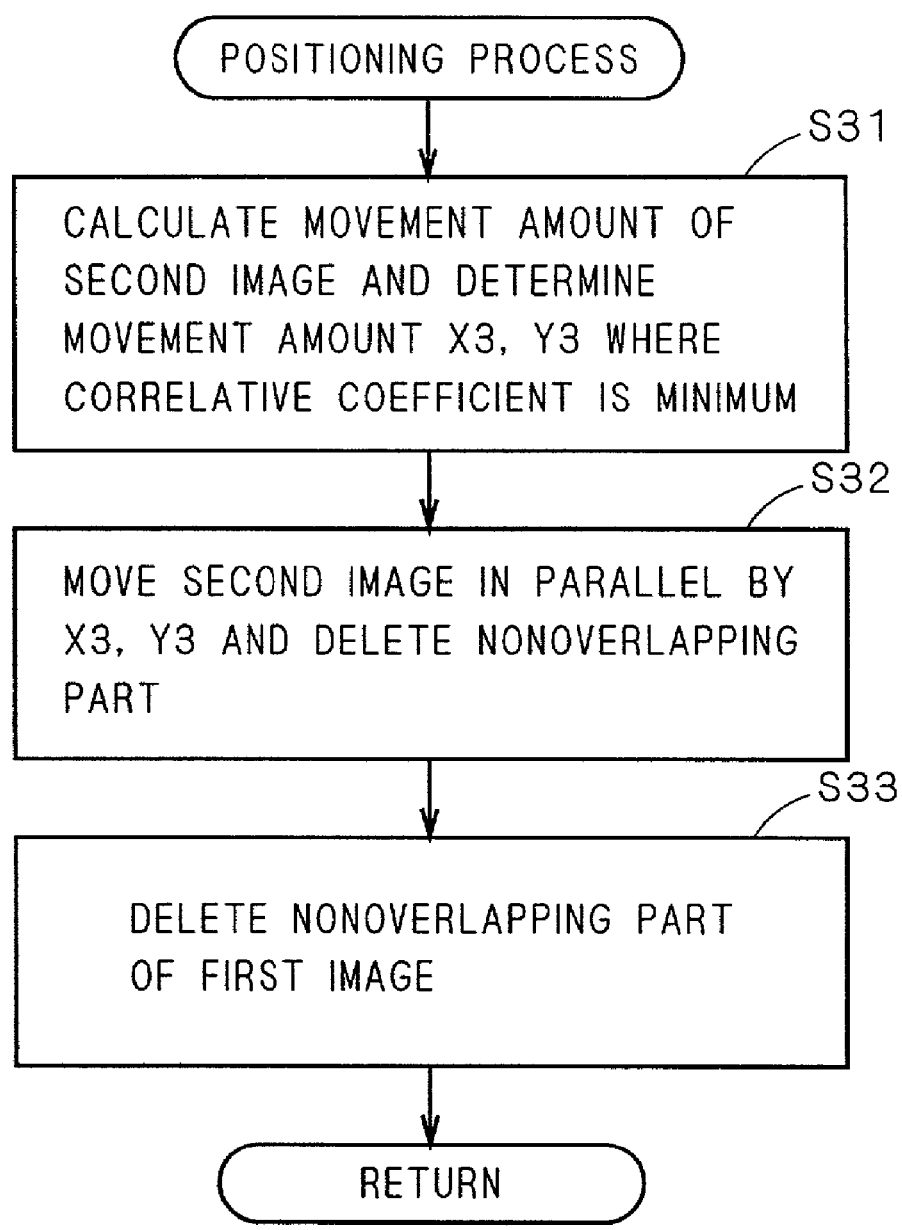
FIG. 10 is a view showing a processing procedure of a positioning process.

Next, in response to that the second image F2 is stored in the second memory 126b of the image memory, the image synthesizer 159 of the general controller 150 reads out the captured first image F1 and the second image F2 from the image memory and performs positioning of these images (step S22). This positioning process is such that both of the images to be synthesized are positioned so as to synthesize the same patterns in the image accurately in the image synthesis process. In this positioning process, the second image F2 is moved while referring the first image F1 as a reference image. FIG. 10 is a flow chart showing a flow of this positioning process.

In step S31, a movement amount of the second image F2 in the rectangular XY plane coordinate system is calculated. This can be achieved by determining a movement amount by which the correlative coefficient $C(\xi, \eta)$ represented by the following Expression 1 is minimum, assuming that the second image F2 is moved in parallel in the X direction and the Y direction.

$$C(\xi,\eta)=\Sigma\Sigma\{P1(x,y)-P2(x-\xi,y-\eta)\}^2 \quad \text{[Expression 1]}$$

In the above expression, x, y represent coordinate variables in the rectangular XY plane coordinate system whose origin is the center of the image, P1 (x, y) represents levels of image data at the coordinate points (x, y) of the first image F1, and P2 (x−ξ, y−η) represents levels of image data at the coordinate points (x−ξ, y−η) of the second image F2. That is, the correlative coefficient $C(\xi, \eta)$ expressed by the Expression 1 is obtained by squaring a difference in level between corresponding image data of two images, and calculating a total sum of the resultant values for all pixel data. And, when (ξ, η) which represents movement amount of the second image F2 is changed, the (ξ, η) at which the correlative coefficient C becomes minimum will be a movement amount of the second image F2 when the both images are best matched.

In the present preferred embodiment, (ξ, η) at which the correlative coefficient C becomes minimum is calculated as (x3, y3), for example, by changing ξ representing movement amount regarding the X coordinate of the second image F2 from −80 to +80, and η representing movement amount regarding the Y coordinate of the second image F2 from −60 to +60. It is to be noted that in the gradation control mode, since the first image F1 and the second image F2 are captured while changing the exposure time of the CCD 303, there is a difference in brightness level of entire image between the first image F1 and the second image F2. Therefore, it is preferred to determine the correlative coefficient C after normalization by dividing both image data by the respective average brightness's.

Furthermore, in this positioning process, only G color component which exerts a large influence on the resolution from the view point of the human visual characteristic may used. In such a case, as for the R, B color components which exert a little influence on the resolution from the view point of the human visual characteristic, positioning processes can be simplified by utilizing the movement amount calculated for the G color component.

Next, in step S32, as shown in FIG. 11, the second image F2 is moved in parallel by the calculated movement amount (x3, y3). Then, after completion of the parallel movement, the part not overlapping with the first image F1 is deleted from the image data of the second image F2 resulting from parallel movement. Next, in step S33, also in the first image F1, the part of the image data not overlapping with the second image F2 is deleted. In this way, image data of the part not required for synthesizing images (represented by hatching in FIG. 11) is deleted, and image data necessary for synthesis having been subjected to accurate positioning can be obtained.

Since the first image F1 and the second image F2 have been subjected to shading correction by the shading correction circuit 123 at the time of capturing of images, positioning of images can be achieved without being influenced by a shading.

Figure 12A:
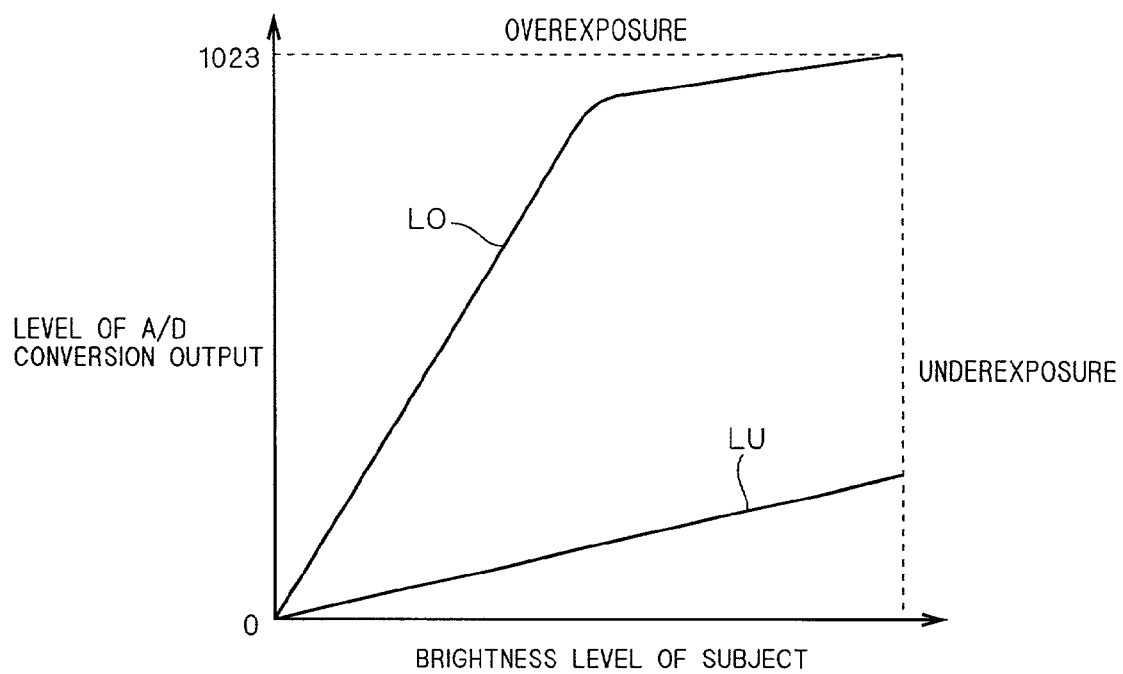
FIG. 12A is a view showing respective gradation characteristics of an overexposed image and an underexposed image.

Next, synthesis process of images having been subjected to positioning process is performed by the image synthesizer 159 of the general controller 150 (FIG. 9, step S23). Now, A/D conversion output level with respect to the brightness level of the subject in the first image F1 and the second image F2 will be explained. As shown in FIG. 12A, since the exposure amount is suppressed for the underexposed first image F1, the gradation characteristic is as shown by the characteristic LU, such that the A/D conversion output level is suppressed to low with respect to the brightness level of the subject. On the other hand, as for the overexposed second image F2, the exposure amount is excess, and hence the gradation characteristic will be such that the A/D conversion output level is emphasized to be high with respect to the brightness level of the subject as shown by the characteristic LO.

Figure 12B:
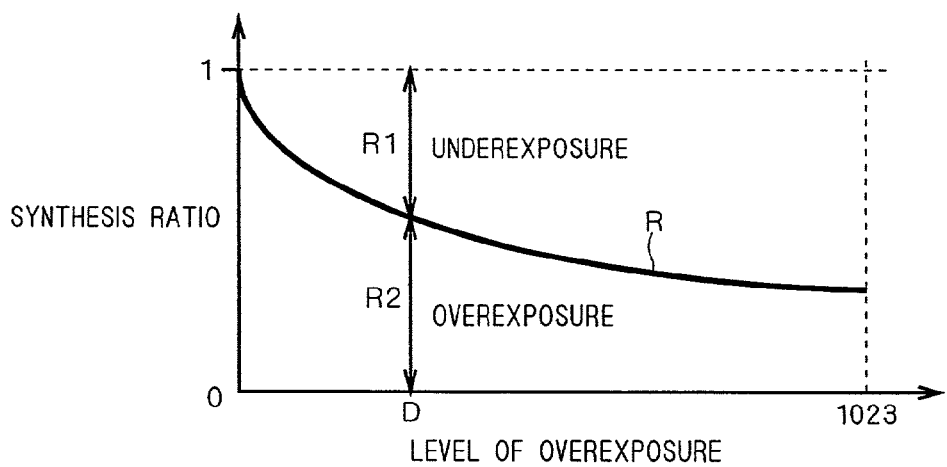
FIG. 12B is a view showing a synthesis ratio of an overexposed image and an underexposed image in a gradation control process.

In the image synthesis process, by adding the image data of the first image F1 and the image data of the second image F2 for every pixel at an appropriate adding ration, image data having desired gradation characteristic within the range interposed between the gradation characteristic LU and the gradation characteristic LO in FIG. 12A is generated. FIG. 12B is a view showing a curve R representing adding ratios at various levels on the basis of the level of the overexposed second image F2. As shown in the drawing, the adding ratios are not constant regardless of the level of the image data, and as the level of the overexposed second image F2 decreases, the adding ratio of the overexposed second image F2 increases. The adding ratio of the overexposed second image F2 is made large as described above for making it easier to view dark portions of the subject.

To be more specific, if the level P2 (i, j) of the pixel data at the coordinate point (i, j) of the second image F2 is D as shown in the drawing, for example, the level P2 (i, j) of the pixel data and the level P1 (i, j) of the pixel data at the coordinate point (i, j) of the first image F 1 are added to each other by R2:R1 to generate the level P3 (i, j) of the pixel data of the synthesized image under gradation control. In this way, by adding all the pixel data at the adding ratio in accordance with the level of the pixel data of the overexposed second image F2, all pixel data of the synthesized image under gradation control is generated. As a result, a gradation-controlled synthesized image having an intermediate gradation characteristic between the gradation characteristic of the first image F1 and the gradation characteristic of the second image F2.

Next, in the recording controller 156 of the general controller 150, a predetermined compression process is effected on the generated synthesized image to generate captured image data. In addition to this, data for thumbnail image and tag information is generated. Then, an image file is generated from the captured image data of synthesized image thus generated and the data for thumbnail image and tag information, and recorded onto the memory card 8 (FIG. 9, step S24).

In the above, explanation was made for the first preferred embodiment, and in the present preferred embodiment, at the time of capturing image data of two images to be used for synthesis, each of these image data is subjected to shading correction by the shading correction circuit 123 which is a counter processing hardware circuit. Therefore, it is possible to achieve the subsequent positioning process without being influenced by a shading. In addition, since the shading correction is implemented by a special hardware circuit, it is possible to perform the shading correction with relatively high speed.

In the present preferred embodiment, each of two images is subjected to the shading correction at the time of capturing image data. However, it is also possible to make control so that shading correction is effected on only the second image F2 exposed with a large amount of light without effecting shading correction for both of the captured two images.

To be more specific, at the time of capturing the data of the first image F1 which is two-step underexposed with a smaller amount of light, the image data having subjected to A/D conversion is inputted to the WB circuit 124 and subjected to a predetermined process rather than being inputted to the shading correction circuit 123. That is, the shading correction process of step S16 in FIG. 9 may be omitted.

In such a case, as described above, by configuring so that the two-step underexposed first image F1 which is exposed with a relatively small amount of light is priorly captured, shading correction process between the first image F1 and the second F2 is not effected, so that it is possible to reduce the exposure interval. Therefore, it is possible to reduce the positional difference due to the difference in timing of exposure time, and hence to achieve more accurate positioning.

2. Second Preferred Embodiment

Next, the second preferred embodiment of the present invention will be explained. In the first preferred embodiment, the shading correction is executed by a count processing hardware circuit which is a special circuit at the time of capturing image data, however, the present invention differs from the first preferred embodiment in that the image data is directly stored in the image memory and the shading correction is executed by software. The image processing apparatus according to the present preferred embodiment is as same as the digital camera 1 shown in the schematic views of appearance in FIGS. 2 to 4.

Figure 13:
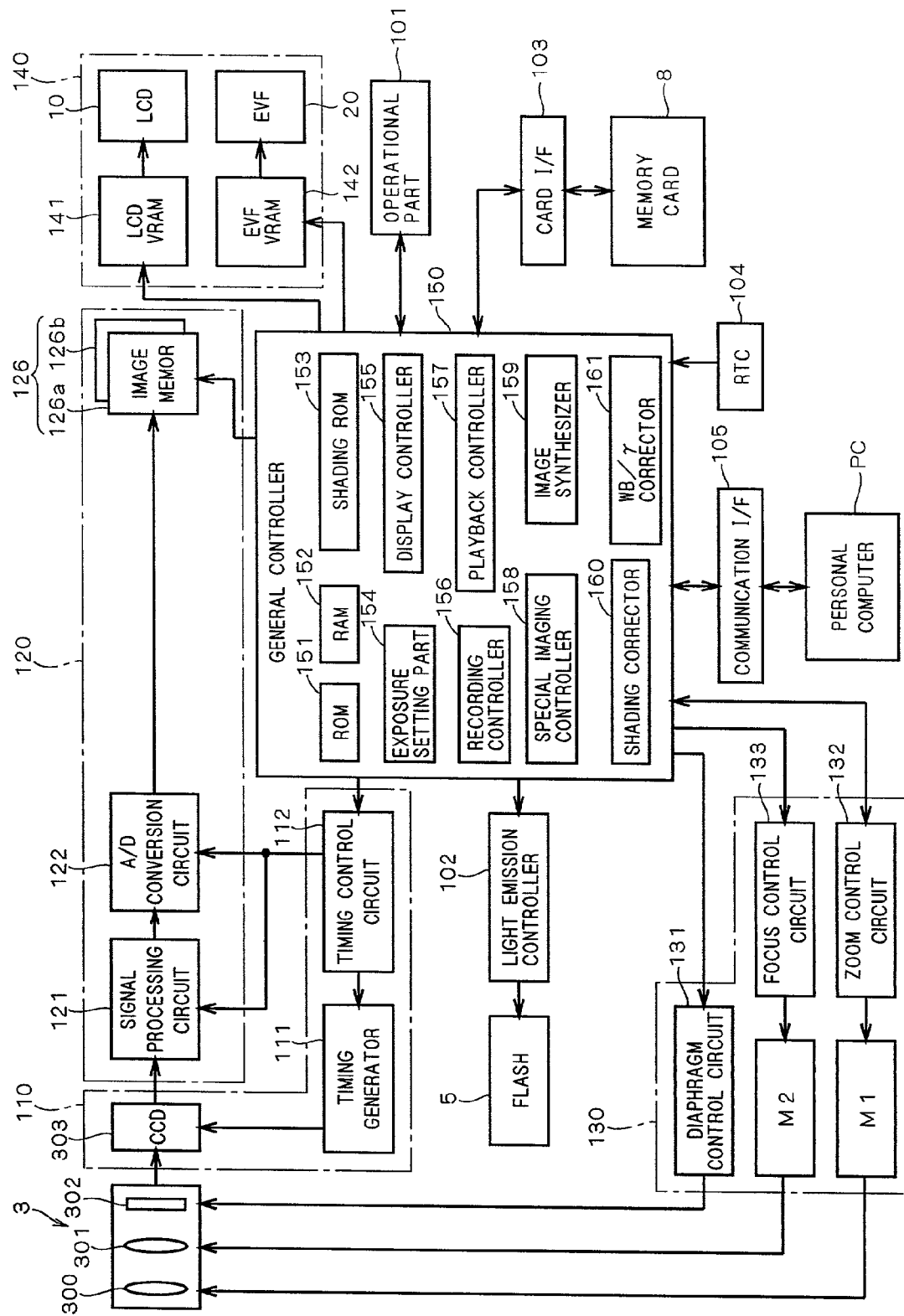
FIG. 13 is a block diagram showing a functional configuration of an image processing apparatus in the second preferred embodiment.

FIG. 13 is a schematic block diagram showing an internal configuration of the digital camera 1 which is the image processing apparatus according to the present invention. In this drawing, those having the same functions as in the first preferred embodiment are denoted by the same reference numerals and detail description thereof will be omitted.

The digital camera 1 of the present preferred embodiment has a shading corrector 160 implemented by a processing program of the general controller 150 and for performing a shading correction by software, in place of the shading correction circuit 123.

The shading corrector 160 implements the process as same as the process executed by the shading correction circuit 123 in the first preferred embodiment. That is, it performs shading correction by multiplying obtained image data and the correction table stored in the shading ROM 153. Shading correction is effected on the image data that having been subjected to A/D convention in the first preferred embodiment, however, the present preferred embodiment differs from the first preferred embodiment in that shading correction is effected on the image data stored in the image memory 126.

Also in the same manner, the white balance adjustment process and γ correction process are implemented by software. Therefore, a WB/γ corrector 161 is provided as a function implemented by processing programs in the general controller 150 in place of the WB circuit 124 and the γ correction circuit 125. The processes in this WB/γ corrector 161 are as same as the processes in the WB circuit 124 and the y correction circuit 125. In the normal exposure mode, this WB/y corrector 161 performs a predetermined process on the image data having been subjected to the shading correction in the shading corrector 160. On the other hand, in the gradation control processing mode, a predetermined process is effected on the synthesized image resulting from the synthesis process by the image synthesizer 159.

Furthermore, in the first preferred embodiment, the image memory 126 stores image data outputted from the CCD 303 for which a predetermined signal process has been completed. To the contrary, in the present preferred embodiment, image data of the CCD-RAW form which has been outputted from the CCD 303 and just subjected to the A/D conversion is stored. The general controller 150 reads out the image data of the CCD-RAW form and performs the above-mentioned processes such as shading correction.

Figure 14:
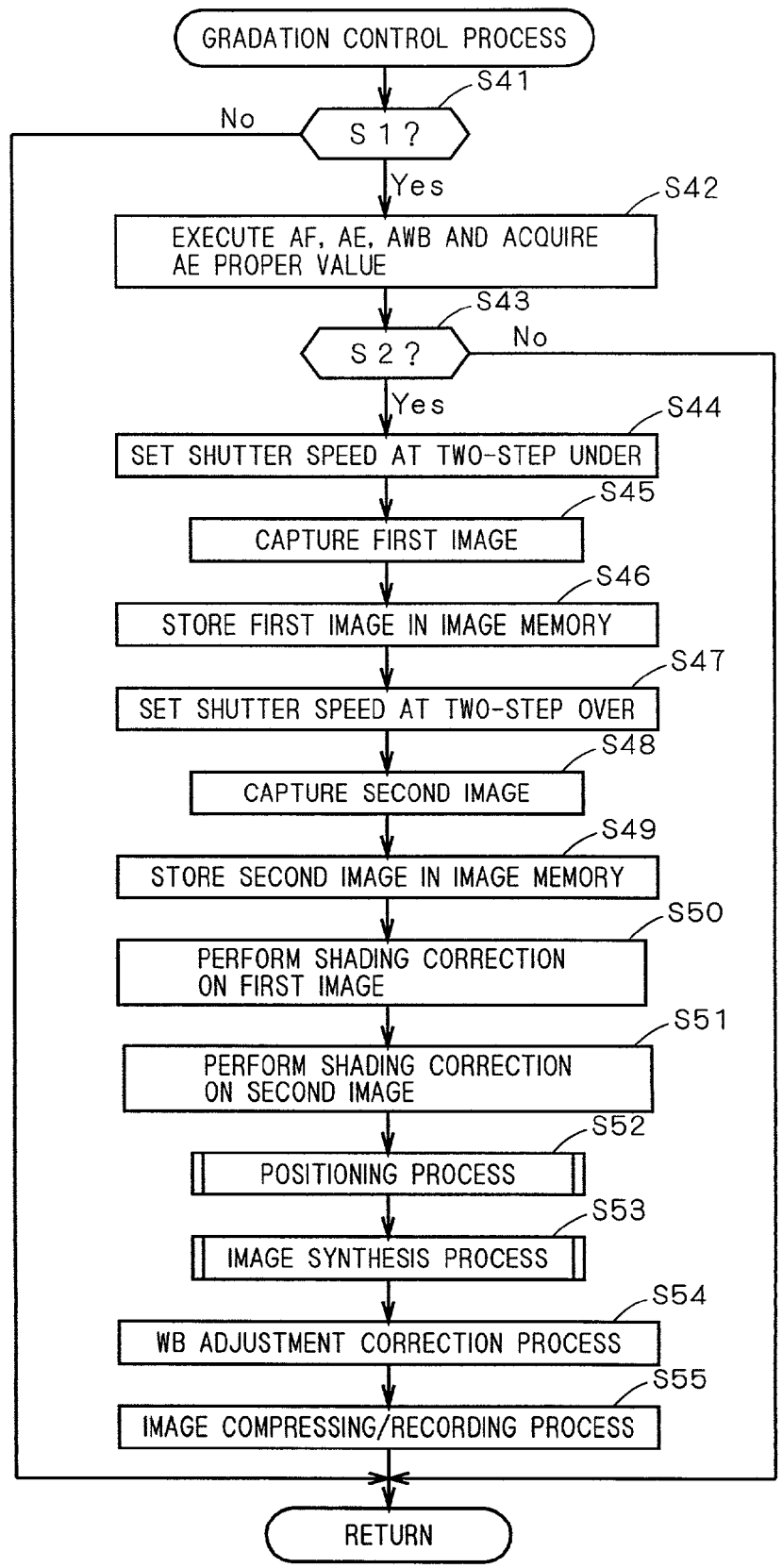
FIG. 14 is a view showing a processing procedure of a gradation control process in the second preferred embodiment.

Next, an image capturing operation in the gradation control processing mode of the digital camera 1 configured as described above will be explained. FIG. 14 is a flow chart showing a procedure of image capturing operation in the gradation control processing mode.

First, in step S41, when the shutter button is pressed half way down, as preparation for image capturing, a focal point of the lens group 30 of the imaging lens 3 is adjusted for a main subject, an exposure control value is calculated by using a live view image and a white balance adjustment value is set. The exposure control value which is calculated at this time is a value to provide correct exposure, and concretely, a shutter speed and an f-number which are correct values are obtained (step S42).

Next, when the shutter button 9 is pressed all the way down in step S43, the shutter speed is set at a shutter speed which is at two steps under the shutter speed which is a correct value (step S44). Then, the CCD 303 is exposed to the light for an exposure time corresponding to this shutter speed, and thereby a first image F1 of the subject is captured (step 45).

After the exposure, an image signal outputted from the CCD 303 is subjected to a predetermined analogue signal processing in the signal processing circuit 121, and converted into pixel data of 10 bits in the A/D conversion circuit 122. Then, the A/D converted first image F1 is stored in the first memory 126a in the image memory 126 in the CCD-RAW form (step S46). As for this first image F1, since the exposure time of the CCD 303 is set shorter than the proper value, the image is in general dark because of less amount of light exposure compared to images captured in the normal exposure mode.

Next, from the shutter speed which is a proper value, a shutter speed of two steps over is set (step S47), and the CCD 303 is exposed to the light for an exposure time corresponding to this shutter speed, and a second image F2 of the subject is captured (step S48). After exposure, as is the same with the first image F1, an image signal outputted from the CCD 303 is subjected to a predetermined analogue signal processing in the signal processing circuit 121, converted into pixel data of 10 bits in the A/D conversion circuit 122, and stored in the second memory 126b of the image memory in the CCD-RAW form (step S49). As for this second image F2, since the exposure time of the CCD 303 is set longer than the proper value, the image is in general light because of the amount of light exposure is larger in comparison with images captured in the normal exposure mode.

Next, the shading corrector 160 of the general controller 150 reads out the first image F1 from the first memory 126a of the image memory 126 and performs shading correction (step S50). This process can be achieved by executing the same multiplication process of the image data and the correction table in the first preferred embodiment by software. Then, the shading corrector 160 stores the first image F1 that has been subjected to shading correction in the first memory 126a again. In the same manner, the shading corrector 160 reads out the second image F2 from the second memory 126b of the image memory 126, performs shading correction, and stores again in the second memory 126b (step S51).

Next, the image synthesizer 159 of the general controller 150 reads out the shading corrected first image F1 and the second image F2 from the image memory and performs positioning and synthesis processes of these images (step S52, S53). These processes are as same as those in the steps S22 and S23 in FIG. 9. Also in the present preferred embodiment, the shading correction is effected before performing the positioning process, it is possible to perform the positioning process without being influenced by a shading.

Next, the WB/γ corrector 161 of the general controller 150 performs adjustment of white balance and γ correction on the generated synthesized image (step S54). The following process of step S55 is as same as in step S24 of FIG. 9.

In the above, explanation was made for the second preferred embodiment, and in the present preferred embodiment, at the time of capturing image data of two images to be used for synthesis, each of these image data is subjected to shading correction by way of software. Therefore, it is possible to achieve the subsequent positioning process without being influenced by a shading.

In addition, since any image processing such as shading correction is not executed between exposures of the first image F1 and the second image F2, it is possible to reduce the exposure interval. Therefore, it is possible to achieve more accurate positioning by reducing a positional difference between images due to a difference in exposure timing.

Also, it is possible to control so that the shading correction is not effected on the first image F1 that has been two-step underexposed with a relatively small amount of light. That is, step S50 of FIG. 14 is omitted. As a consequence of this, it is possible to reduce the total time before generating a gradation-controlled synthesized image.

3. Third Preferred Embodiment

Next, the third preferred embodiment of the present invention will be explained. In the second preferred embodiment, an image is synthesized while performing a shading correction and a synthesized image having been subjected to the gradation control process is stored in the memory card 8 in the recording mode, and the present preferred embodiment differs form the second preferred embodiment in that two images captured in the recording mode are stored in the memory card 8 as they are, and image synthesis process can be executed in the playback mode.

The image processing apparatus according to the present preferred embodiment is a digital camera 1 having a similar appearance to the schematic configurationally views of FIGS. 2 to 4, and having a similar internal configuration to the schematic block diagram shown in FIG. 13.

The exposure mode of the digital camera 1 of the present preferred embodiment has a gradation control exposure mode, as well as a normal exposure mode for normally capturing an image one by one. In contrast to the aforementioned gradation control processing mode in the above preferred embodiment, the gradation control exposure mode is a mode limited to capturing two images of different exposures for the same subject in different timings, and recording the respective images onto the memory card 8.

In the gradation control exposure mode, since the recording controller 156 of the general controller 150 uses the obtained image data for the subsequent image synthesis or the like, the data is directly stored as the captured image data without performing compression which may deteriorate the image quality. That is, the image data of the CCD-RAW form stored in the image memory 126 and just A/D converted is directly subjected to the recording process as the captured image data. Since two captured image data of different exposures are generated by a single shutter operation in the gradation control exposure mode, an image file wherein tag information is attached to the captured image data of the CD-RAW form and a thumbnail image is generated for each of the two images, and the image files are stored in the memory card 8. To the exposure mode of the tag information of the generated image file, information making it possible to recognizing the captured image for gradation control such as "gradation control exposure mode ½" is given. This "gradation control exposure mode ½" represents that it is the first image file captured in the gradation control exposure mode.

Figure 15:
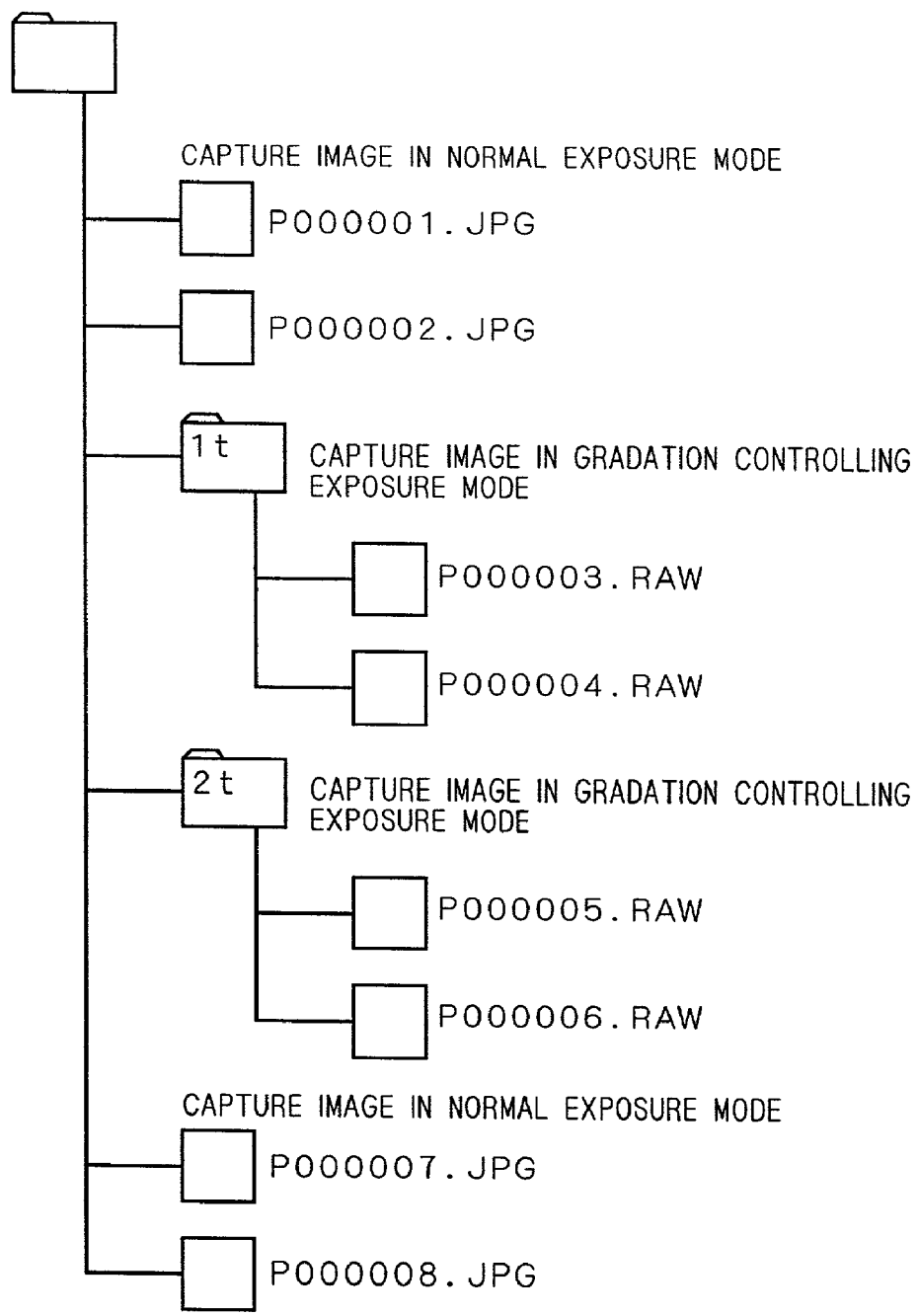
FIG. 15 is a view showing a configuration example of image file stored in a memory card.

FIG. 15 shows an example of configuration of an image file stored in the memory card 8. In FIG. 15, "P000001.JPG", "P000002.JPG" and the like represent the names of image files. In the present preferred embodiment, the name of image file is expressed by "PL.M" and "L" in the "PL.M" represent a 6-order number indicating the order that the image file is generated, and "M" represents an extension indicating the form of the captured image data. In "M", "JPG" represent captured image data compressed in the JPEG form and recorded, and "RAW" represents captured image data recorded in the CCD-RAW form. The captured image data captured in the normal exposure mode is represented by the extension "JPG", and the captured image data captured in the gradation control exposure mode is represented by the extension "RAW".

In the gradation control exposure mode, data of two images are continuously captured, and image files are generated for each of these captured image data, so that the both image files are stored in the same folder in the memory card 8 according to the present preferred embodiment. In the drawing, "1t", "2t" and the like represent folder names of image files captured in the gradation control exposure mode. In the present preferred embodiment, a folder name is represented by "Nt", and "N" shows captured order in the gradation control exposure mode.

Figure 16:
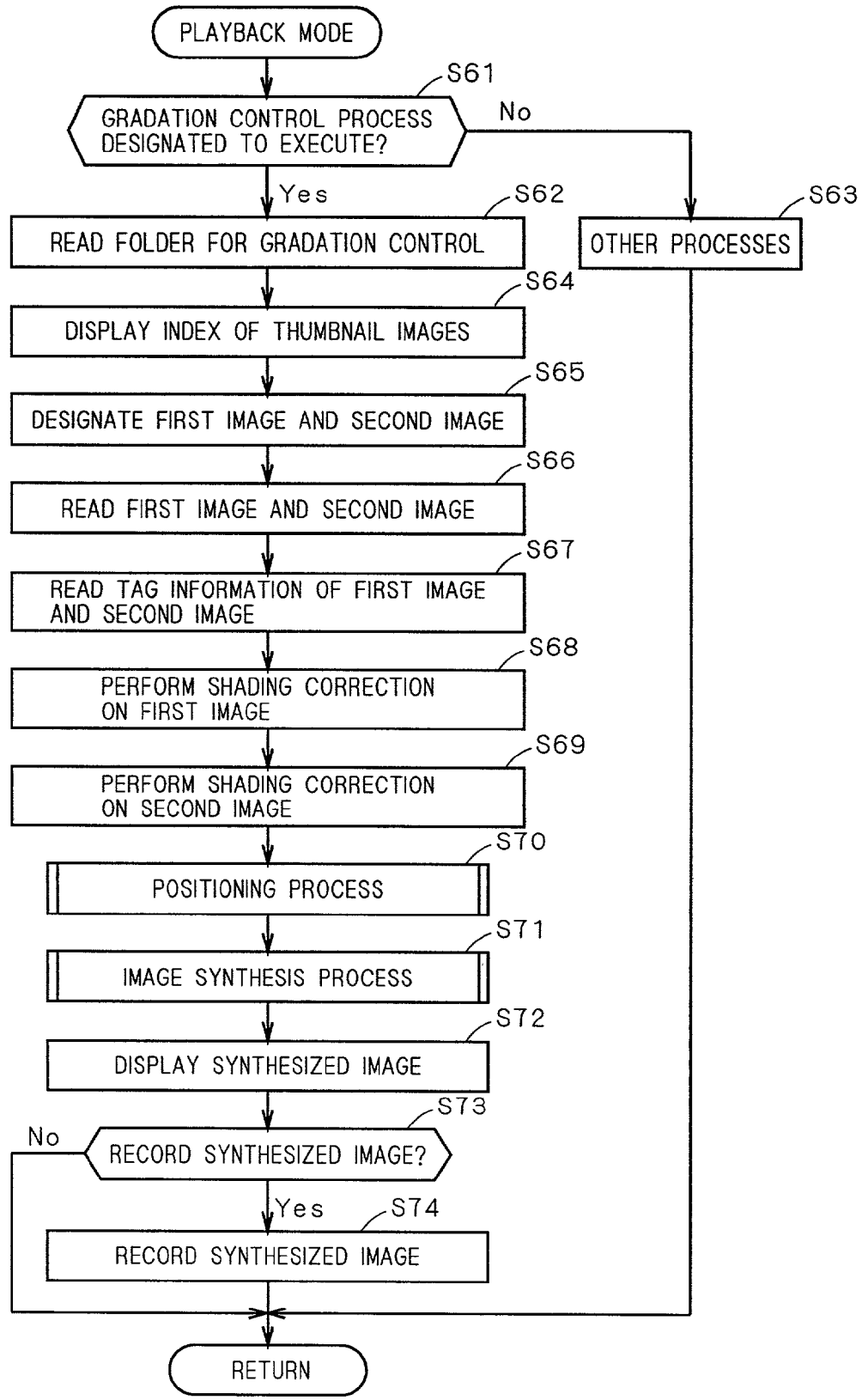
FIG. 16 is a view showing a processing procedure of a gradation control process in the third preferred embodiment.

Next, a gradation control process in the playback mode of the digital camera 1 thus configured will be explained. FIG. 16 is a view showing a flow of the gradation control process in this playback mode.

Figure 17A:
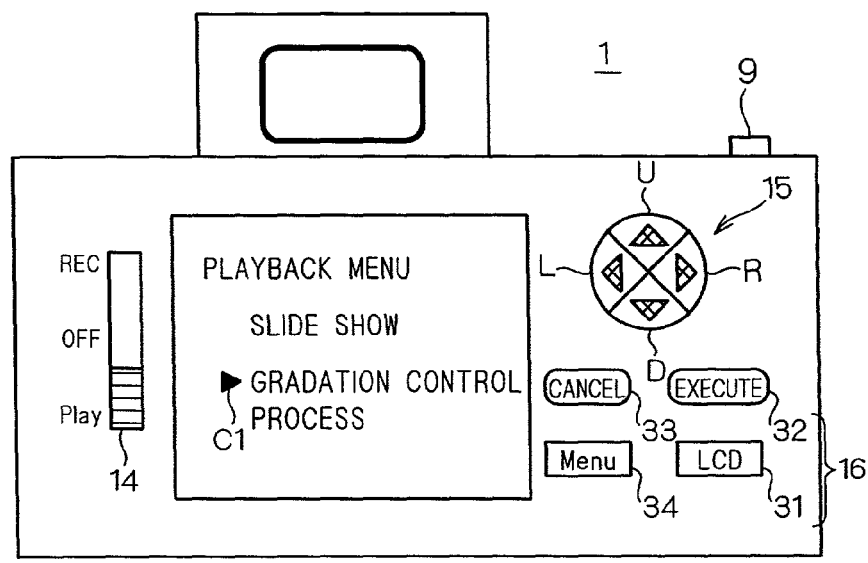
FIG. 17A is a view showing a selection screen for an image to be subjected to a gradation control process in the playback mode.

When the playback mode is selected by the power switch 14, and the menu display switch 34 is pressed down, a playback menu screen as shown in FIG. 17A is displayed on the LCD 10. On the playback menu screen, it is possible to select special playback methods other than the normal playback display of captured image. These special playback methods include a gradation control process. The user operates the four-gang switch 15 to move a cursor Cl displayed on the LCD 10 so as to point at the gradation control process, and presses down the execute switch 32 to give a direction for the gradation control process to the digital camera 1 (step S61).

On this playback menu screen, when a special playback method such as slide show other than the gradation control process is designated, a predetermined process according to the designated special playback method will be executed (step S63).

Next, the playback controller 157 of the general controller 150 searches only the folder of the image file captured in the gradation control exposure mode from captured images stored in the memory card 8, and reads out a thumbnail image (step S62). To be more specific, folders represented by the folder name "Nt" are sequentially searched from the memory card 8, and only thumbnail images of the first image F1 and the second image F2 included in the folder are read out.

Figure 17B:
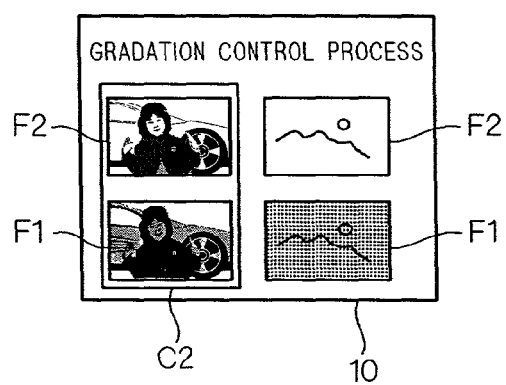
FIG. 17B is a view showing a playback screen in the playback mode.

Next, the playback controller 157 stores the thumbnail images in the LCD VRAM 141 according to such an index form that four thumbnail images are two-dimensionally arranged in 2×2 per one page of the screen of the LCD 10. As a result of this, two sets of combination of two thumbnail images captured in the gradation control exposure mode are displayed on the LCD 10 as shown in FIG. 17B (step S64).

When the image captured in the gradation control exposure mode is displayed, the user operates the four-gang switch 15 and the switch group 16 to move a cursor C2 displayed on the LCD 10 and designate the first image F1 and the second image F2 to which the gradation control process is to be executed (step S65). In the case of designating an image that has been captured in the gradation control exposure mode, this cursor C2 for selecting an image can designate either combination of two thumbnail images. That is, the user can designate any first image F1 and second image F2 by a single designating operation.

When the first image F1 and the second image F2 to which the gradation control process is to be executed are designated, the playback controller 157 reads out designated two captured image data of the CCD-RAW form and stores them in the image memory 126 so as to allow the subsequent process to be executed (step S66). Furthermore, the playback controller 157 reads out the respective tag information of the designated two image files, and stores them in the RAM 152 (step S67).

Next, the shading corrector 160 of the general controller 150 reads out the first image F1 from the image memory 126 and performs shading correction thereon (step S68). This process is achieved by multiplication of the image data and the correction data by using software as is the same with the second preferred embodiment. The correction table used in this shading correction is selected from the shading ROM 153 using the tag information read out from the file of the first image F1. Since the tag information includes the focal length and the f-number at the time of exposure, it is possible to select the correction table that is suited for the optical condition at the time of exposure. The shading corrector 160 stores the first image F1 that has been subjected to the shading correction in the image memory 126 again, and reads out the second image F2 from the image memory 126 and performs shading correction in the same manner as described above (step S69).

Next, the image synthesizer 159 of the general controller 150 reads out the first image F1 and the second image F2 that have been subjected to the shading correction from the image memory 126, and performs positioning and synthesis of these images to generate a gradation-controlled synthesized image. These processes are as same as steps 22 and 23 in FIG. 9 (steps S70, S71). The generated synthesized image is displayed on the LCD 10, and the user confirms the result of the synthesis process by referring to the LCD 10 (step S72). Also in the present preferred embodiment, since the shading correction is performed before executing the positioning process, it is possible to achieve positioning of images without being influenced by a shading.

Next, when a predetermined time has elapsed after the synthesized image was displayed on the LCD 10, LCD 10 displays a screen which enables the user to select whether or not the generated synthesized image is to be recorded. When the user gives an instruction to record the image on this screen, the recording controller 156 of the general controller 150 performs recording process of the generated synthesized image. That is, while a captured image data is generated by performing a predetermined compressing process, the data is recorded on the memory card 8 as an image file with the data of thumbnail image and tag information being added thereto (step S73, S74).

In the above, the third preferred embodiment was explained, and in the present preferred embodiment, an image is read out from the memory card 8 and a shading correction is performed by software before executing the synthesis process. Therefore, the subsequent positioning can be executed without being influenced by a shading.

Furthermore, processes such as shading correction, positioning and image synthesis generally require a long time, and if these processes are executed in the recording mode, a processing time from image capturing to recording to the memory card 8 would be elongated. In the present preferred embodiment, these processes can be performed at user's convenient time.

4. Fourth Preferred Embodiment

Next, the fourth preferred embodiment of the present invention will be explained. In the above third preferred embodiment, the gradation control process such as synthesis process with respect to the recorded captured image data is performed in the digital camera, however, according to the present preferred embodiment, the gradation control process is performed by an image processing apparatus configured by a personal computer or the like. That is, an image processing apparatus such as digital camera having image pickup means just makes continuous exposures of two images to be used for synthesis, and an image processing apparatus configured by a personal computer or the like performs gradation control process such as positioning of these two images and image synthesis process.

The two images used for the gradation control process are images captured in the gradation control exposure mode of the digital camera according to the third preferred embodiment. That is, the captured image data underexposed than the correct exposure (the first image F1) and the captured image data overexposed than the correct exposure (the second image F2) that have been subjected to only the A/D conversion and recorded in the CCD-RAW form are used. In addition, it is preferred to use image files in each of which tag information including optical conditions at the time of exposure and a thumbnail image are added to the captured image data of the CCD-RAW form.

FIG. 18 is an appearance view showing a configuration of the image processing apparatus according to the present preferred embodiment. As shown in FIG. 18, the image processing apparatus 50 has a personal computer 60 and a printer 70 which is an output device thereof.

The personal computer 60 has a computer main body 61, a display 62 for making various displays, a keyboard 63 and a mouse 64 for receiving an entry from a user. Furthermore, the computer main body 61 has a reading devices 61a, 61c for reading out various data from a recording medium 90 such as magneto-optic disc, and a memory card reader 61b for performing read of a memory card.

The personal computer 60 stores a plurality of correction tables used for the shading correction in a stationary disk which is a predetermined memory device in the computer main body 61. These correction tables each are associated in advance with the type of digital camera that is assumed to capture images for use in the gradation control process (digital camera having a function of capturing two images while varying the exposure amount for the same subject, hereinafter, referred to as "assumed camera"). Furthermore, a plurality of correction tables are stored for each of parameters or optical conditions such as focal length and f-number at the time of capturing an image in an assumed camera. That is, by designating the camera which the two captured image data to be subject to the gradation control process and the optical conditions at the time of capturing those captured image data (hereinafter, referred to as "correction table selecting condition"), it is possible to select an optimum correction table for use in the shading correction.

Furthermore, the personal computer 60 stores a gradation control program for synthesizing data of two captured images of different amounts of light exposure in a stationary disk inside the computer main body 61 and generating a synthesized image having a desired gradation. The personal computer 60 functions as an image processing apparatus that performs the gradation control process by reading out the gradation control program from the stationary disk and executing the program. This gradation control program is in advance installed in the computer main body 61 via a reader 61a or 61b from a recording medium such as a magneto-optic disk on which that program is recorded. Also, this gradation control program may be installed by downloading the same over a communication line such as the Internet from a predetermined server storage device.

Figure 19:
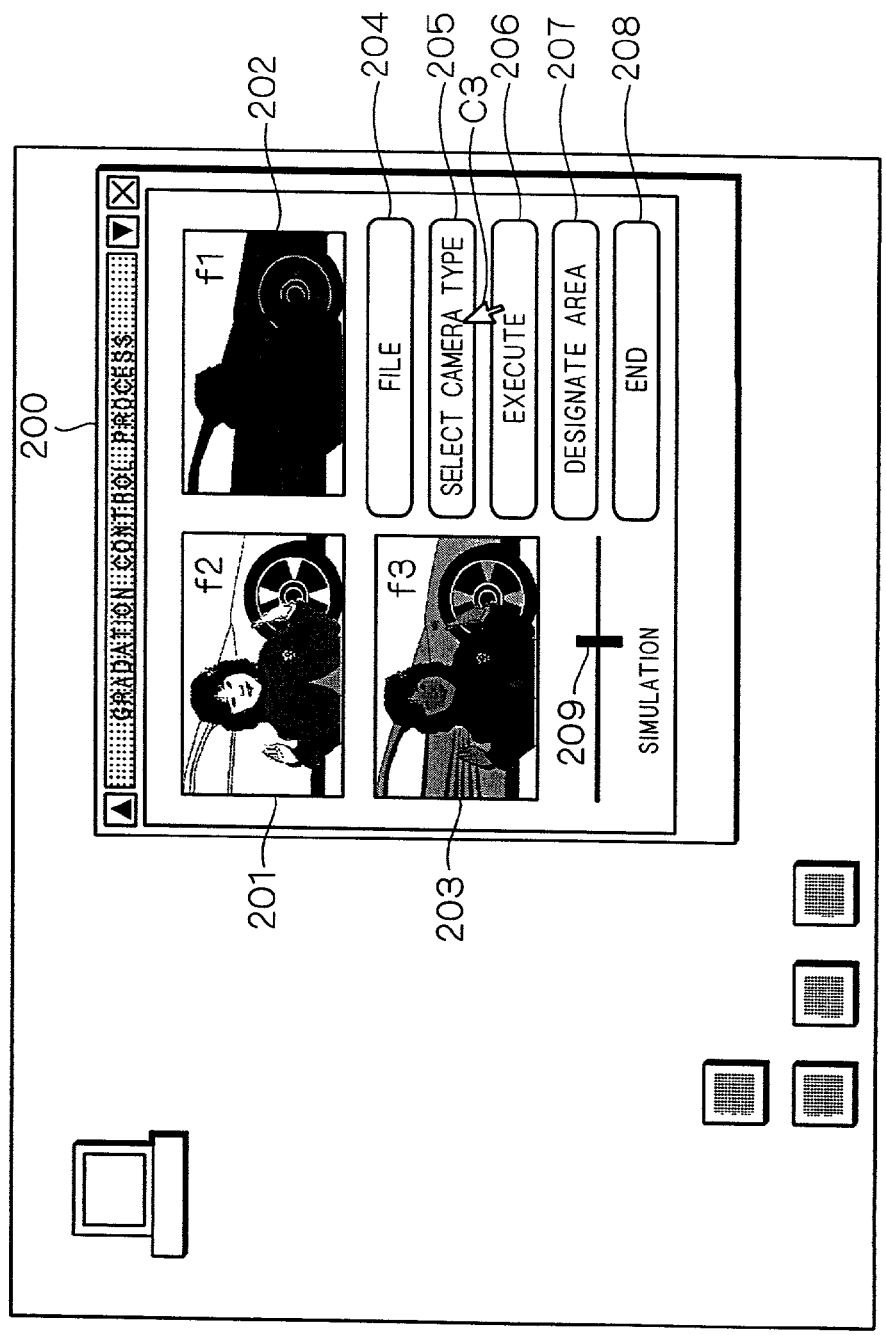
FIG. 19 is a view showing one example of a work window displayed on the display in the case where a gradation control program is executed.

FIG. 19 is a view showing one example of a work window displayed on the display 62 when the personal computer 60 executes the gradation control program. In a work window 200 are displayed three display regions 201 to 203 for displaying thumbnail images of image data related to the gradation control process, and command buttons 204 to 208 for designating the process contents, process conditions and the like.

The display region 201 and the display region 202 are arranged on the upper side of the screen, and a thumbnail image f2 of the overexposed second image F2 is displayed in the display region 201, and a thumbnail image f1 of the underexposed first image F1 is displayed on the display region 202. Furthermore, the display region 203 is arranged on the lower side of the display region 201, and a thumbnail image f3 resulted from synthesis of the thumbnail image f1 and the thumbnail image f2 and gradation control simulation.

Furthermore, the command buttons 204 to 208 are vertically arranged on the lower side of the display region 202. It is possible to designate predetermined process assigned to the respective command buttons by clicking these command button with a mouse cursor C3.

The command button displayed "FILE" (hereinafter, "file button") is intended for designating an image file. This file button 204 is clicked, and then a file designating window opens, allowing designation of image files of the first image F1 and the second image F2 to be subjected to the gradation control process from a memory card or the like attached to the memory card reader 61b. In the case where an image file captured using the digital camera of the third preferred embodiment is used, since the image files of the first image F1 and the second image F2 are included in the same folder "Nt", both of the image files can be designated by designating the folder.

The command button displayed "EXECUTE" (hereinafter, "execute button") 206 is intended for actually executing the gradation control process by using data of two captured images of different amounts of light exposure. Details of the gradation control process will be described later.

The command button displayed "SELECT CAMERA TYPE" (hereinafter, "camera selection button") 205 is intended for designating a camera with which the data of two captured images to be subjected to the gradation control process, and an optical condition at the time of capturing that data of captured images. That is, by operating this camera selection button 250, it is possible to designate the condition for selecting a correction table.

Figure 20:
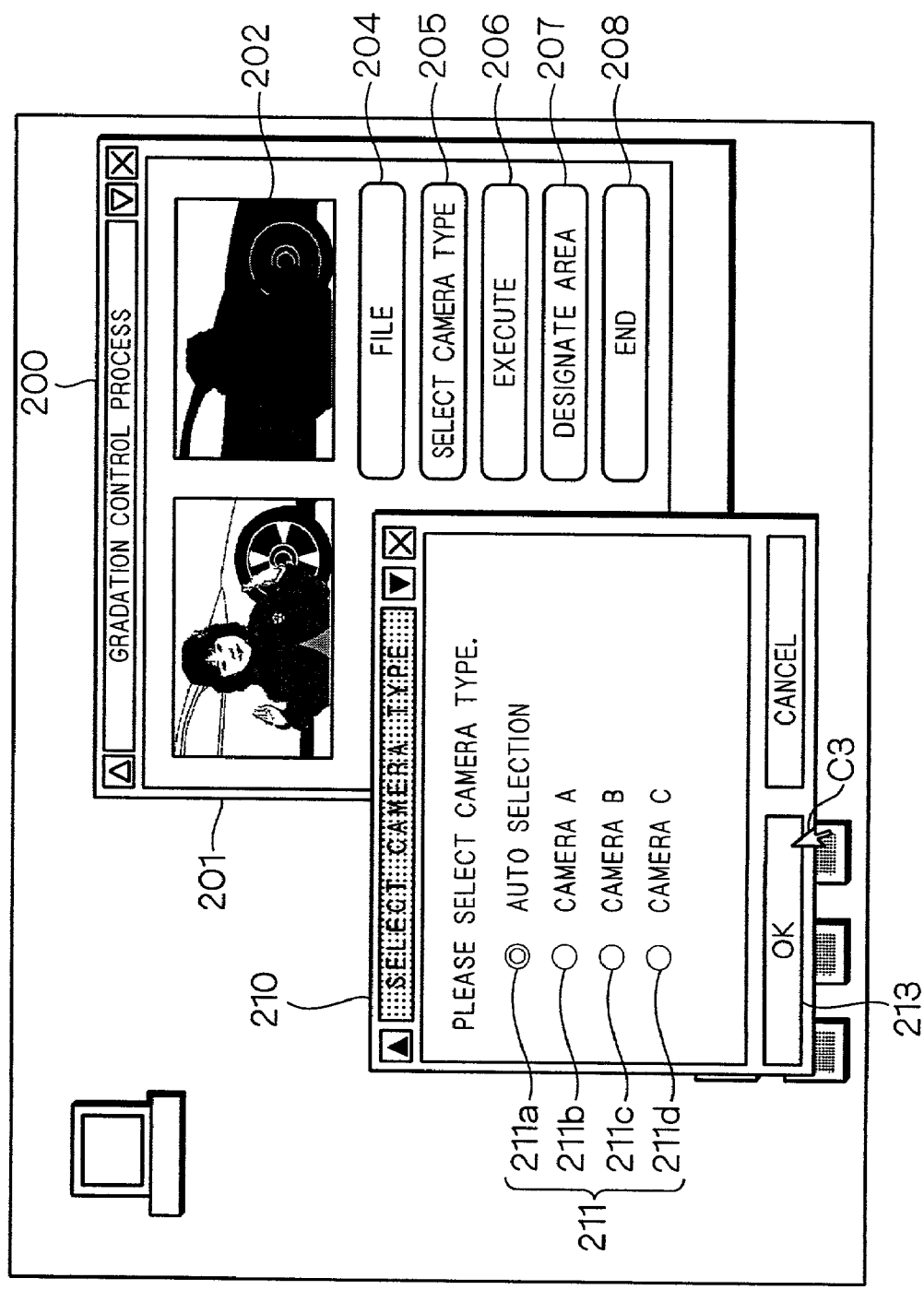
FIG. 20 is a view showing an example of a camera selection window displayed on the display.

The camera selection button 205 is selected, and then a camera selection window 210 as shown in FIG. 20 is displayed on the display 62. The camera selection window 210 includes an optional button group 211 having an auto selection button 211 a and assumed camera buttons 211b to 211d to which names of assumed cameras are assigned. The assumed camera buttons 211b to 211d are displayed in the same number as the number of types of assumed cameras registered in advance, though three buttons are displayed in the present drawing. The user can select desired one of the auto selection button 211 a or assumed camera buttons 211b to 211d by clicking it by means of the mouse cursor C2.

In the case where the selection condition of correction table is manually inputted, a corresponding camera name is designated from the assumed camera buttons 211b to 211d. Either one of the assumed camera buttons 211b to 211d is designated and an "OK" button 213 is clicked, and then an optical condition inputting window for inputting a focal length and an f-number. In the optical condition inputting window, the user enters a focal length and an f-number at the time of capturing an image via the keyboard 63. Through such an operation, a correction table selection condition is manually designated.

On the other hand, in the case of using an image file to which tag information is attached, the auto selection button 211a is selected. Tag information previously describes exposure condition information including a camera name, a focal length and an f-number as described above, and by automatically reading these, it is possible to set these as a correction table selecting condition. Therefore, when the auto selection button 211a is selected, it is not necessary for the user to manually input the correction table selecting condition. It is to be noted that when designations of camera and optical condition at the time of capturing an image is not made by operating the camera selection button 205, this auto selection button 211a is selected by default.

Returning to FIG. 19, the command button displayed "DESIGNATE AREA" (hereinafter "area designation button") 207 is intended for designating a positioning area A1 for use in positioning of two captured image data. In the present preferred embodiment, when the above-mentioned correlative coefficient C in the positioning process is calculated, pixel data in the designated positioning area A1 is summed rather than summing all pixel data, to determine the correlative coefficient C.

Figure 21:
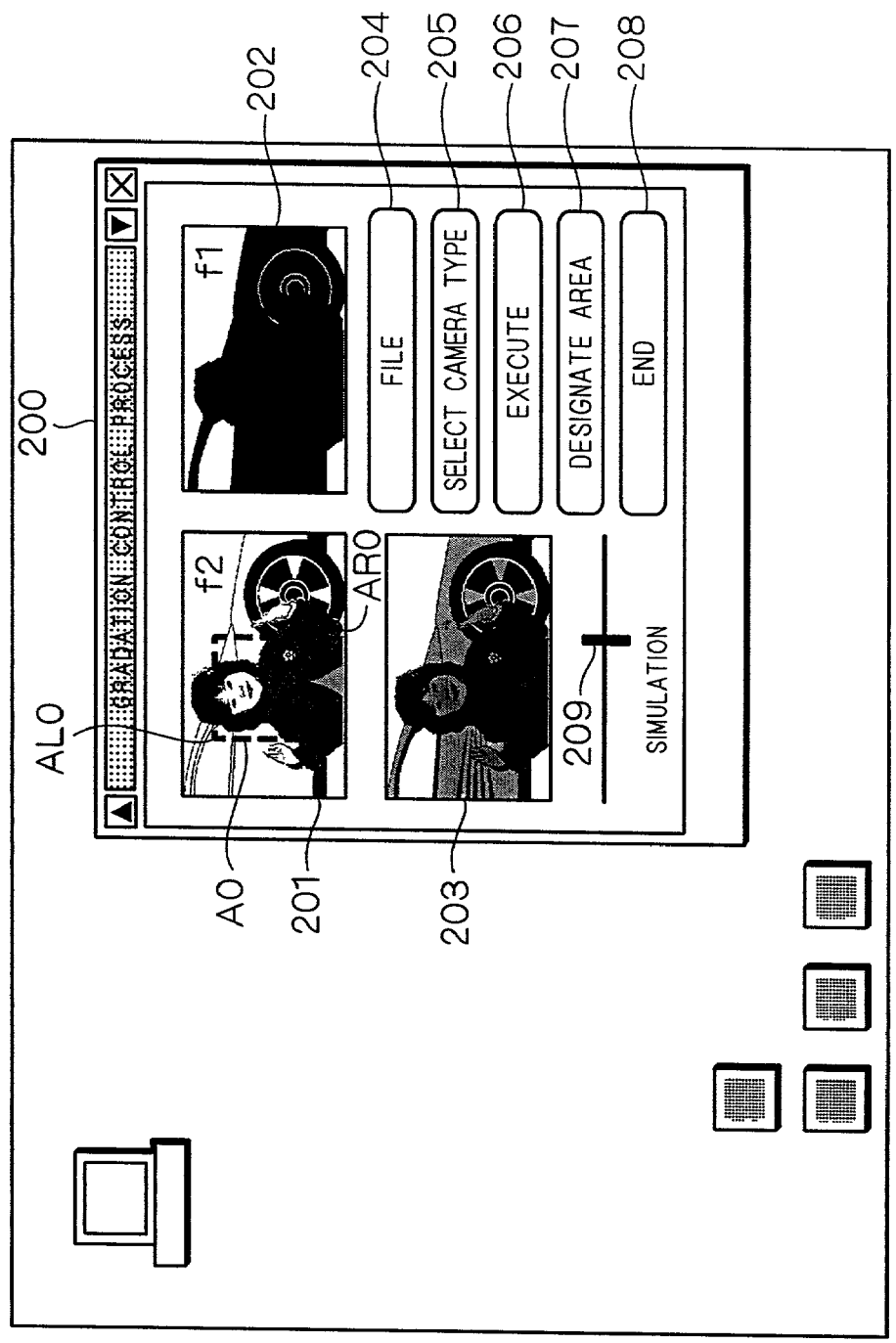
FIG. 21 is a view showing an example of designating a positioning area using thumbnail images displayed on the display.

Designation of this positioning area is achieved by designating the area corresponding to the positioning area in the real captured image data as a positioning temporary area A0 by using the thumbnail image f2 displayed on the display region 201 as shown in FIG. 21. Based on the positioning temporary area A0 designated by this thumbnail image f2, the positioning area A1 of the real captured image data is set at the time of gradation control process. The rectangular positioning temporary area A0 is defined by the positions of point AL0 which is the left top end point and the point AR0 which is the right bottom end point in a rectangular XY plane coordinate in which the center of the image is an origin point. Concretely, the point that the user first clicks in the thumbnail image f2 is designated as the coordinate point of the left top end point AL0, and the point that the user clicks next is designated as the coordinate point of the right bottom end point AR0.

Returning to FIG. 19, the command button displayed "END" (hereinafter, "end button") 208 is provided for ending execution of the gradation control program. The user clicks this END button to end all the processes.

Further, a slider 209 is displayed on the lower part of the display region 203 of the work window 200. This slider 209 is intended for setting a synthesis ratio between the thumbnail image f1 and the thumbnail image f2 in the simulation for gradation adjusting process using the thumbnail images. The term "synthesis ratio" used herein is a synthesis ratio of the general thumbnail image f1 and the thumbnail image f2 rather than the adding ratio of each level of overexposed image data shown in FIG. 12B. In FIG. 12B, it resembles the area ratio between the upper area partitioned by the curve R representing the adding ratio characteristic (the area where the underexposed first image F1 is added) and the lower area (the area where the overexposed second image is added).

Therefore, by moving the slider 209 in the right and left direction using the mouse cursor C3, the curve R representing the adding ratio characteristic in FIG. 12B is shifted in the up and down direction, and thereby the synthesis ratio is desirably set. Concretely, as the slider 209 is moved to the right from the center point, the synthesis ratio of the overexposed second image F2 increases, whereas as the slider 209 is moved left, the synthesis ratio of the underexposed first image F1 increases.

Figure 22:
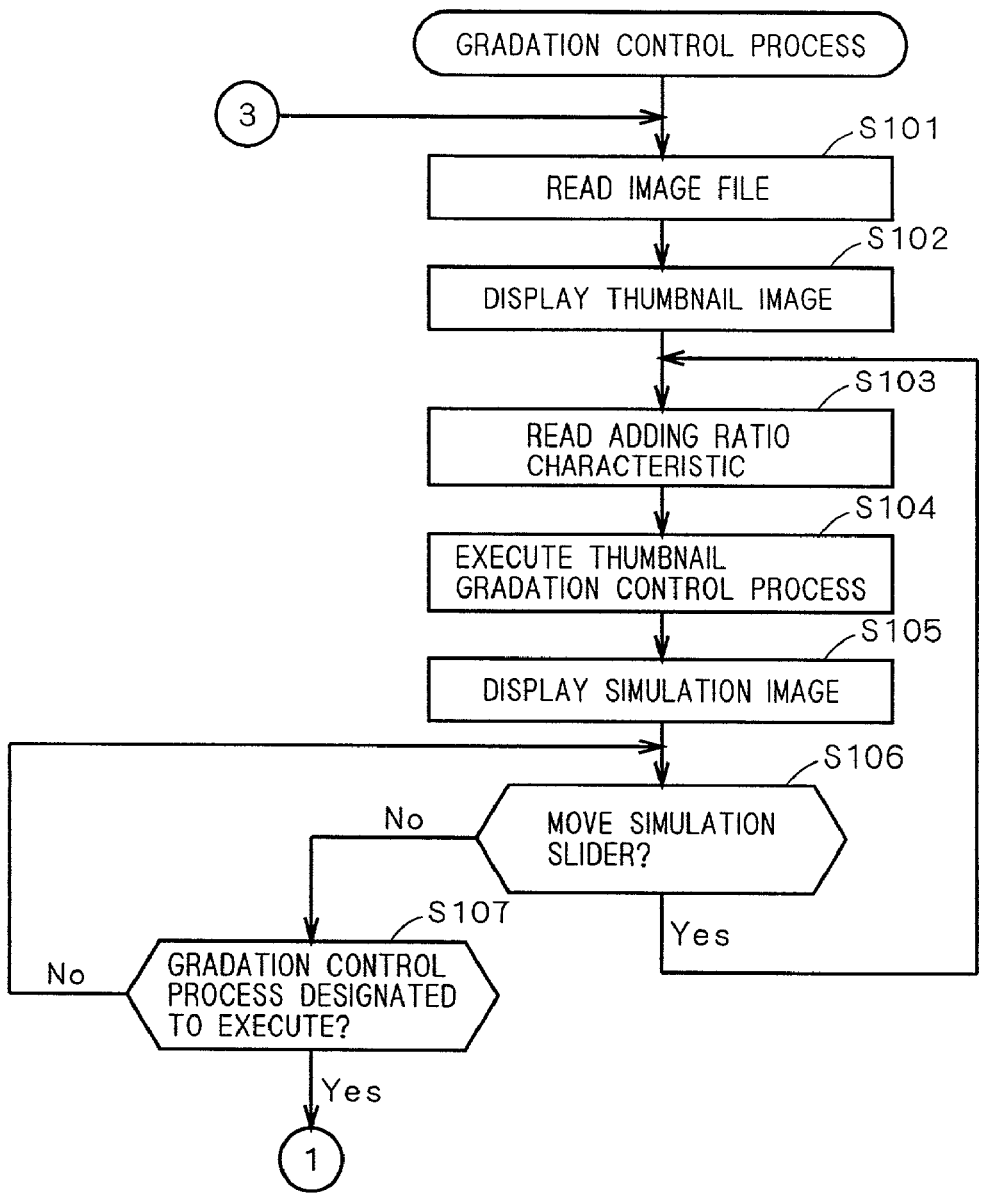
FIGS. 22 and 23 are views each showing a processing procedure of a gradation control program.
Figure 23:
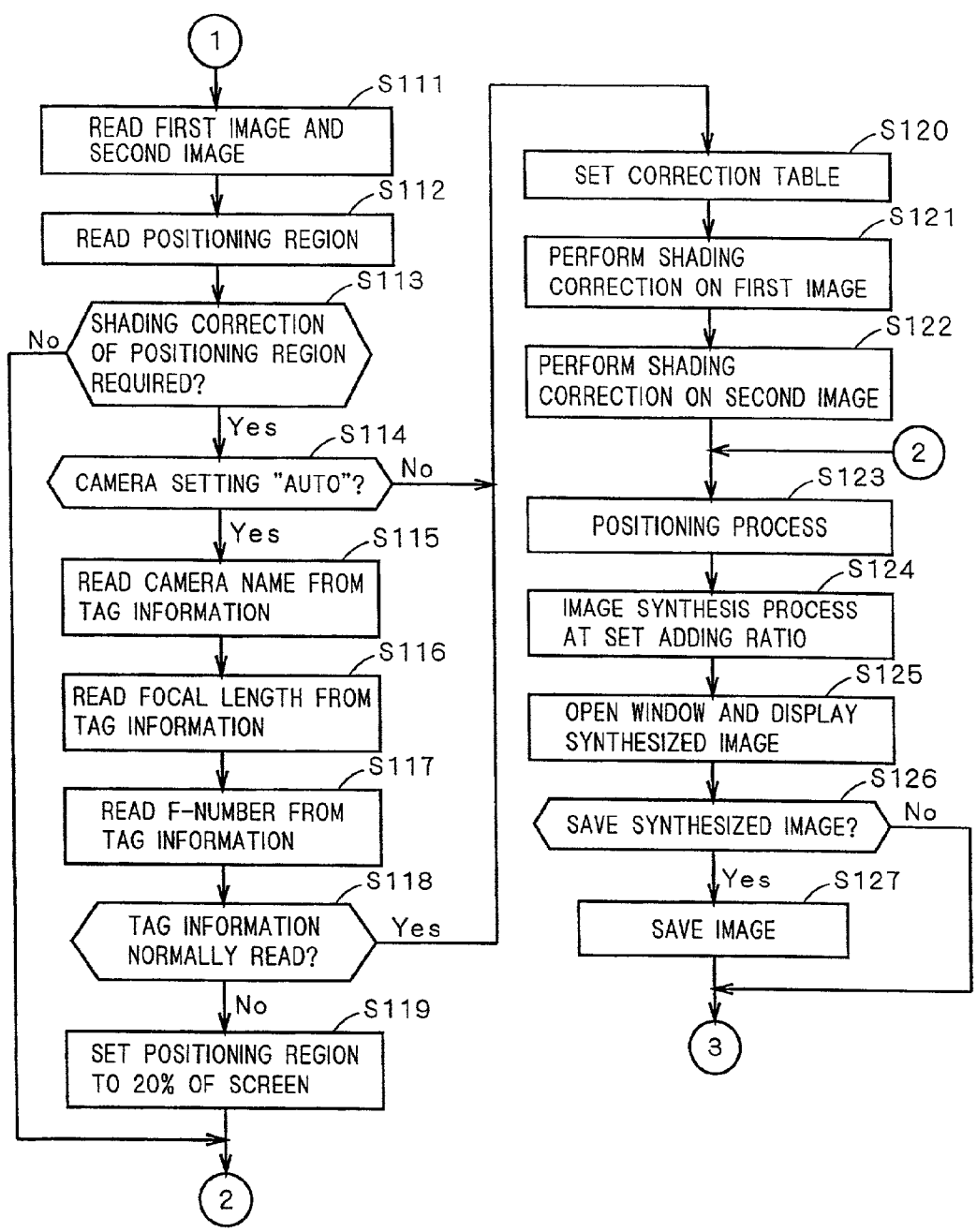

Next, a gradation control process in this image processing apparatus 50 configured as described above will be explained. FIGS. 22 and 23 are flow charts showing procedures of the gradation control process.

First, the user designates two image files for use in the gradation control process. Image files are designated by clicking the file button 204, and the thumbnail images f1, f2 are read from the respective designated image file and displayed on the display region of the work window 200 (steps S101, S102).

Next, an adding ratio characteristic is read from the set position of the slider 209 (step S103), and a gradation control simulation by thumbnail image is performed using that adding ratio characteristic (step S104).

In the gradation control simulation, first a positioning process is performed using all pixel data of the two thumbnail images f1, f2. This positioning process is as same as that of step S22 in FIG. 9. Though the positioning process is performed using all the pixel data, the process can be done with relatively high speed because thumbnail images consisting of a small number of pixel data. Next, based on the set adding ratio characteristic, the thumbnail image f1 and the thumbnail image f2 are synthesized, and the result of the synthesis is displayed in the display region 203 (step S105).

Upon completion of the gradation control simulation by thumbnail images, whether or not the slider 209 is moved is determined (step S106). If the slider is moved, the process returns to step S103, and a gradation control simulation by thumbnail images is performed (steps S103 to S105).

On the other hand, if the slider 209 is not moved, whether or not the execute button 206 is operated is determined (step S107). If movement of the slider 209 and operation of the execute button 206 are not made, the process returns to step S106 to enter a standby state with the simulation result of gradation adjustment by thumbnail images being displayed. Designation of the correction table selection condition by the camera selection button 205 and designation of the positioning temporary area A0 by the area designation button 207 can be made in this standby state.

If the execute button 206 is operated in step S107, the process proceeds to step S111 in FIG. 23, and each of the captured image data (underexposed first image F1 and overexposed second image F2) is read out from the two designated image files.

Next, the positioning area A1 for use in the positioning of the captured image data of the first image F1 and the second image F2 is set (step S112). As for this positioning area, if the user does not previously set the positioning temporary area A0 in the thumbnail image f2 as shown in FIG. 12, the entire captured image data is set as the positioning area A1. If the positioning temporary area A0 is previously designated, the coordinate point in the thumbnail image f2 is converted to the coordinate point in the captured image data and set. For example, if the thumbnail image is generated while reducing the size of the captured image data to 1/n, the coordinate point of the left top end point AL1 of the positioning area A1 is (n·l, n·m) provided that the coordinate point of the left top end point AL0 of the positioning temporary area A0 is (l, m). In the same manner, the coordinate point of the right bottom end point AR1 of the positioning area A1 is set.

Figure 24:
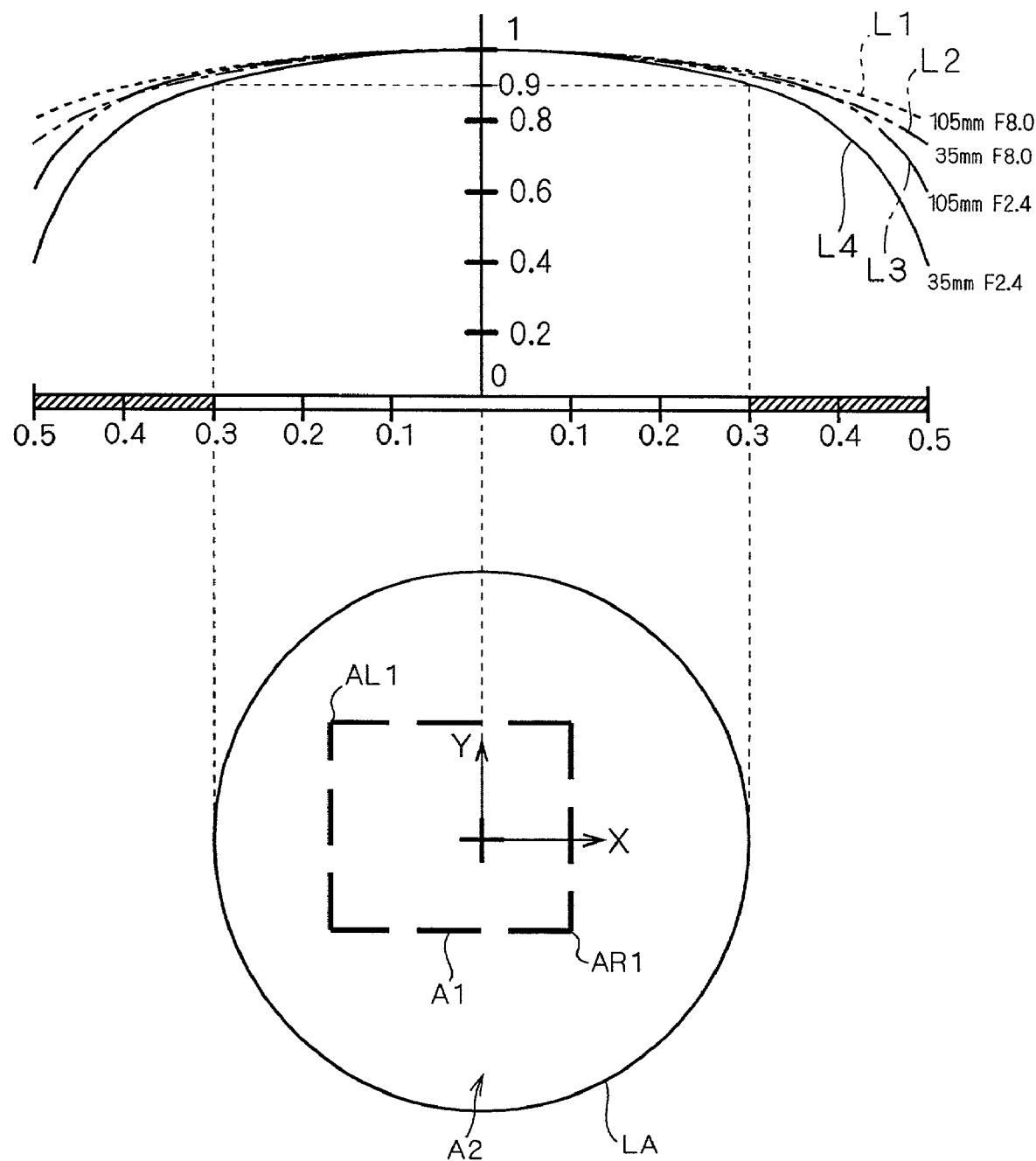
FIG. 24 is a view showing an influence of shading and a non-shading area in captured image data.

Next, whether or not the set positioning area A1 requires a shading correction is determined (step S113). Now, determination of whether or not a shading correction is necessary will be explained with reference to FIG. 24. The upper half of FIG. 24 shows an example of influence by shading as same as FIG. 1. That is, the horizontal axis shows a distance from the center point of captured image data of each pixel data in terms of relative distance provided that the length of the diagonal like of the captured image data is 1. Also, the vertical axis shows a level of each pixel data in terms of relative value. In this context, a predetermine threshold which is considered as not being influenced by shading is set, for example, not less than 0.9 in terms of relative value of the level of the image data. In the same drawing, regardless of the optical conditions such as focal length and f-number, the relative value of the level of the image data is not less than 0.9 in the area within a distance range of 0.3 from the center of the captured image data. That is, it can be considered that an influence by shading will not exert in the area within a distance range of 30% of the length of the diagonal line regardless of the optical condition.

The lower half of FIG. 24 is a view showing an area which is not influenced by shading in the captured image data (hereinafter, "non-shading area") A2 in the rectangular XY plane coordinate whose origin is the center of the captured image data. The boundary curve LA between the non-shading area A2 and the area influenced by shading is nearly circular because of the same distance from the center of the captured image data. In the drawing, the center side area of the boundary curve LA is the non-shading area A2, and the peripheral side area of the boundary curve LA is the area influenced by a shading. If all the pixel data constituting the positioning area A1 is included in this non-shading area A2, it is determined that the positioning area A1 does not require a shading correction. Concretely, if the relative distance from the origin of the coordinate point of the left top end point AL1 of the positioning area A1 and the relative distance from the origin of the coordinate point of the right bottom end point AR1 is not more than 0.3, provided that the length of the diagonal line of the captured image data is 1, it is determined that a shading correction is not required. On the contrary, if the left top end point AL1 or the right bottom end point AR1 is not included in the non-shading area A2, it is determined that a shading correction is required.

Through such a process, if it is determined that a shading correction is not required for the positioning area A1 (No in step S113), the process proceeds to step S123 and a positioning process is performed without performing a shading correction.

If it is determined that a shading correction for the positioning area A1 is required (Yes in step S113), subsequently, whether or not the mode of camera selection is auto selection is determined (step S114). At this time, if the mode of camera selection is not auto selection, that is, if the user manually designates the correction table selecting condition on the screen shown in FIG. 20, it is possible to select the correction table in accordance with this correction table selecting condition. Therefore, the process proceeds to step S120 where a correction table is selected.

On the other hand, if the camera selection mode is auto selection, that is, if the auto selection button 211a is selected on the screen shown in FIG. 20 as described above, information of exposure condition such as camera name, focal length and f-number is read while referring to the tag information of the image files to be used (step S115, S116, S117). By reading the exposure condition information from the tag information, the correction table selecting condition is automatically determined.

Next, whether or not the exposure condition information is successfully read from the tag information is determined (step S118), and if it is successfully read, the process proceeds to step S120 where a correction table is selected.

On the other hand, if the exposure condition information is not read successfully, it is impossible to set the correction table selecting condition, and hence it is impossible to perform a shading correction and perform a correct positioning process. Therefore, the positioning area A1 for use in the positioning process is reduced so that it is within the range that is not influenced by a shading (step S119). This range not influenced by a shading is, for example, a distance range of 30% of the length of the diagonal line of the image from the center of the image as shown in the example of FIG. 24.

In the present preferred embodiment, for realizing a correct positioning process, the size of the positioning area A1 is set at 20% of the size of the captured image data. That is, for the captured image data constituted by the image data of 1600×1200 pixel data, the positioning area A1 is set so that it is constituted by 320×240 pixel data. The center point of the captured image data and the center point of the positioning area A1 coincide with each other. In the case where the positioning area A1 is reduced so that it is within the area not influenced by a shading, it is not necessary to perform a shading correction, so that the process proceeds to step S123 where the positioning process is performed.

In steps S114 to S118, if the correction table selecting condition is set, the correction table is selected in accordance with this correction table selecting condition (step S120). Next, by multiplying the captured image data and the correction table, a shading correction is effected on each of the first image F1 and the second image F2 (steps S121, S122).

In the present preferred embodiment, this shading correction process is performed on only the positioning area A1. That is, the shading correction is performed by multiplying the pixel data only included in the positioning area A1 of the captured image data with inverses of the corresponding correction coefficients. This makes it possible to perform the shading correction on the positioning area A1 and perform the subsequent positioning process accurately, as well as reducing the process time of the shading correction.

Next, in step S123, a positioning process is performed using only the positioning area A1. In this positioning process, pixel data of the positioning area A1 is summed for calculating the movement amount (x3, y3) where the correlative coefficient C ($\xi$, $\eta$) of the second image F2 as described above is minimum. Then, in the same manner as shown in FIG. 11, the entire second image F2 is moved in parallel by the calculated movement amount (x3, y3). Then the pixel data of the part not overlapping with the first image F1 after being moved in parallel and the pixel data of the part not overlapping with the second image F2 in the first image F1 are deleted. As described above, by determining the correlative coefficient C using only the positioning area A1, it becomes possible to achieve accurate positioning with respect to the image position requested by the user, and reduce the process time of the positioning process.

Figure 25:
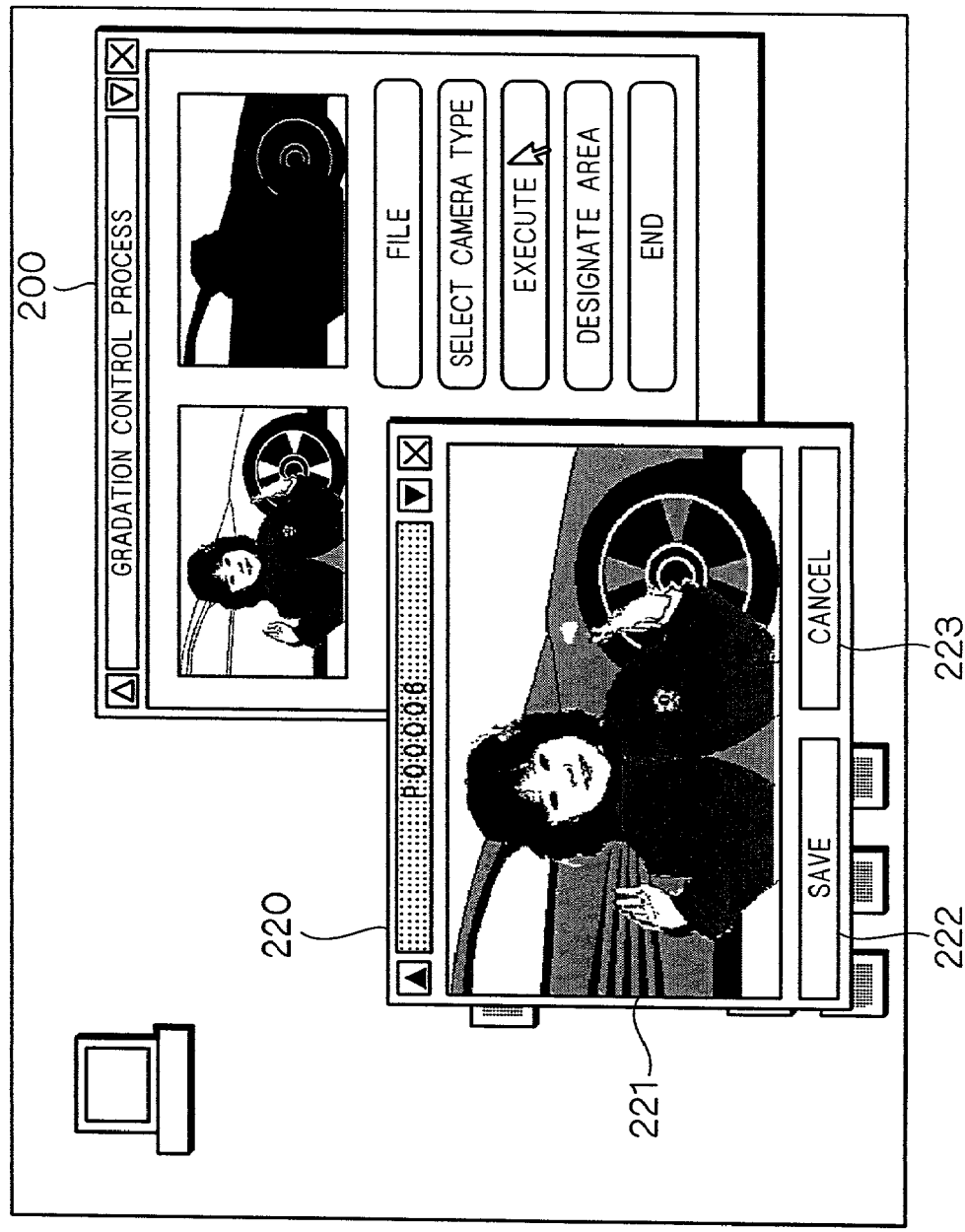
FIG. 25 is a view showing an example of a process result display window displayed on the display.

Subsequently, an image synthesis process of the first image F1 and the second image F2 is performed in accordance with the adding ratio characteristic set by the slider 209 (step S124). Then, a process result display window 220 is displayed on the display 62 as shown in FIG. 25, and a synthesized image is displayed on the display region 221 (step S125). This process result display window 220 includes a save button 222 and a cancel button 223, and by clicking the save button 222 with the mouse cursor C3, the generated synthesized image can be saved in a predetermined memory means (steps S126, S127). When the cancel button 223 is clicked, the image is not saved.

In the above, the fourth preferred embodiment was explained, and according to the present invention, the positioning area A1 is designated, and a shading correction is performed only when the positioning area A1 requires a shading correction. This configuration makes it possible to simplify the processes of shading and positioning and to reduce the process time.

The above preferred embodiment uses the camera type, focal length and f-number were used as correction table selection conditions, however, also the type of imaging lens used at the time of exposure may be set as well.

Furthermore, in the present preferred embodiment, the process was performed in the image processing apparatus in which a personal computer executes the gradation control program, however, the above process may be performed by making a digital camera execute the like gradation control program.

5. Fifth Preferred Embodiment

Next, the fifth preferred embodiment of the present invention will be explained. In the above preferred embodiment, the positioning process and the image synthesis process were performed after performing the shading correction, however, the shading corrector 160 according to the fifth preferred embodiment performs positioning and image synthesis of the first image F1 and the second image F2, and thereafter performs a shading correction.

Among these, calculation of the correlative coefficient C at the time of positioning process uses the positioning area A1 as a limited area, and this area A1 is automatically set by the image synthesizer 159 in the general controller 150.

Assuming that relative spatial movement amounts of the images F1, F2 where the contents of images mutually match (conform) with each other on the basis of the frame coinciding condition of the first image F1 and the second image F2 are referred to as "conforming movement amount", the distribution of the shading correlative coefficients varies with the conforming movement amounts. This is because, though the influence of shading in each of the original two images F1, F2 is matched in the synthesized image, the magnitude of the influence varies with the conforming movement amount.

Other basic configuration of the image processing apparatus according to the present preferred embodiment is as same as the configuration of the digital camera which is the image processing apparatus of the third preferred embodiment. It is also possible to perform the image processings such as positioning process and image synthesis process using the captured image data of the CCD-RAW form stored in the memory card 8 in the playback mode.

Figure 26:
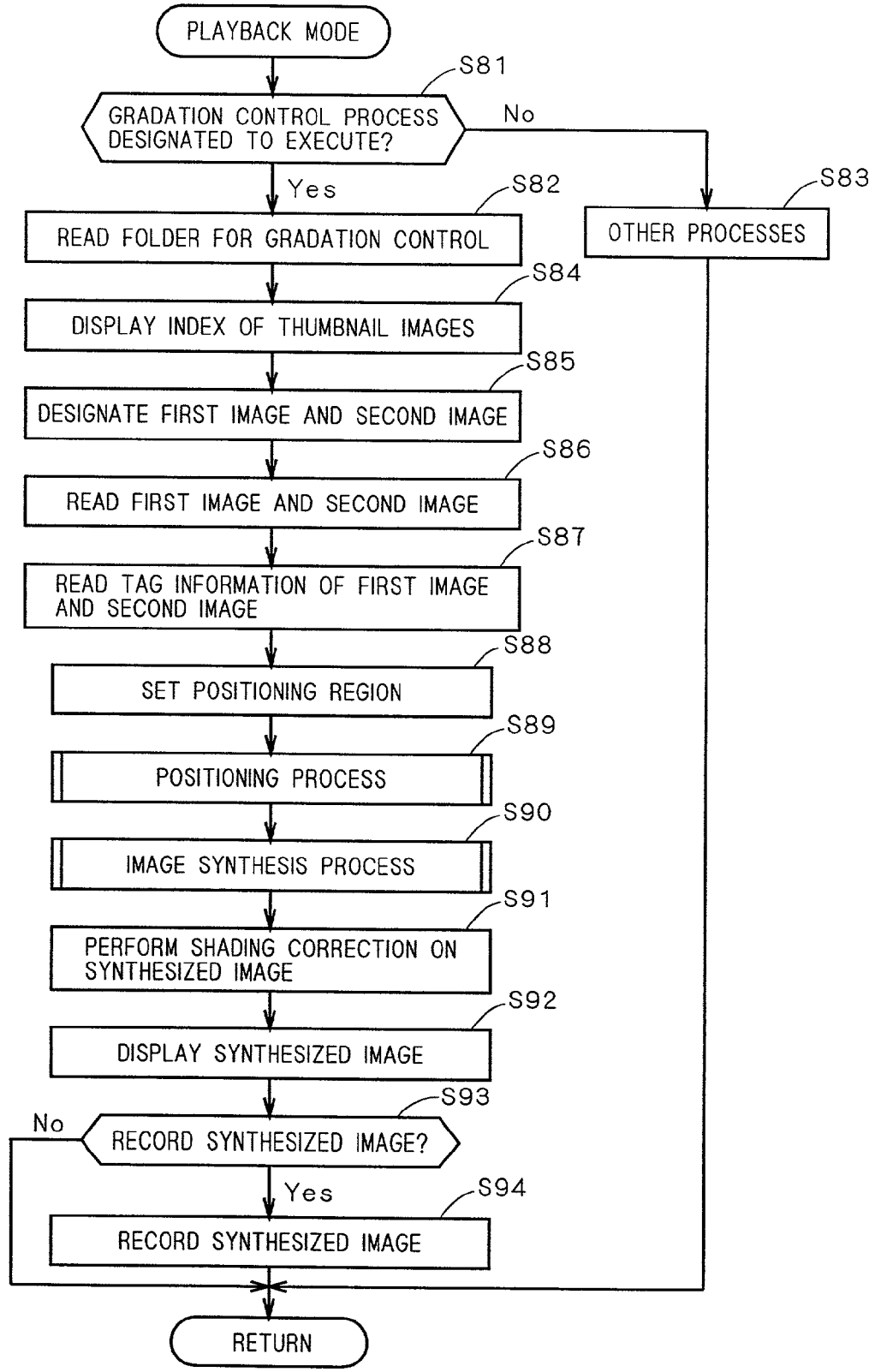
FIG. 26 is a view showing a processing procedure of a gradation control process in the fifth preferred embodiment.

Next, a gradation control process in the playback mode of the digital camera 1 of the present preferred embodiment will be explained. FIG. 26 is a flow chart showing a flow of the gradation control process in the playback mode.

The processes in steps S81 to S87 are as same as steps S61 to S67 of FIG. 16. At the time of completion of step S87, the captured image data of the CCD-RAW form of each of the first image F1 and the second image F2 for use in the gradation control process has been read, and stored in the image memory 126. Further, respective tag information of these two image files have been read and stored in the RAM 152.

Next, a positioning process is performed in the image synthesizer 159 of the general controller 150. In the present preferred embodiment, each of the first image F1 and the second image F2 is not subjected to a shading correction. Therefore, if the positioning process is performed on the entire captured image data, a shading will influence on it, so that the positioning process cannot be conducted accurately. Therefore, before performing the positioning process, the positioning area A1 for use in the positioning process is set from the area not influenced by a shading (non-shading area A2) (step S88).

For setting this positioning area A1, first, a non-shading area A2 of the captured image data to be subjected to the positioning is acquired, and the positioning area A1 is set that the all pixel data is included in the acquired non-shading area A2. As described above, the influence range of shading varies with the focal length and f-number of the imaging lens 3. That is, the non-shading area A2 varies with the focal length and f-number at the time of exposure of the captured image data. Therefore, for acquiring the non-shading area A2, a correction table is referred in which the focal length and the f-number at the time of exposure are parameters. Concretely, a correction table is selected based on the focal length and the f-number at the time of exposure of the captured image data to be subjected to the positioning, and the area where the correction coefficient set in the correction table is, for example, not less than 0.9 is acquired as the non-shading area A2. The information of the focal length and the f-number to be used for selecting the correction table is acquired from the tag information stored in the ROM 151.

Figure 27:
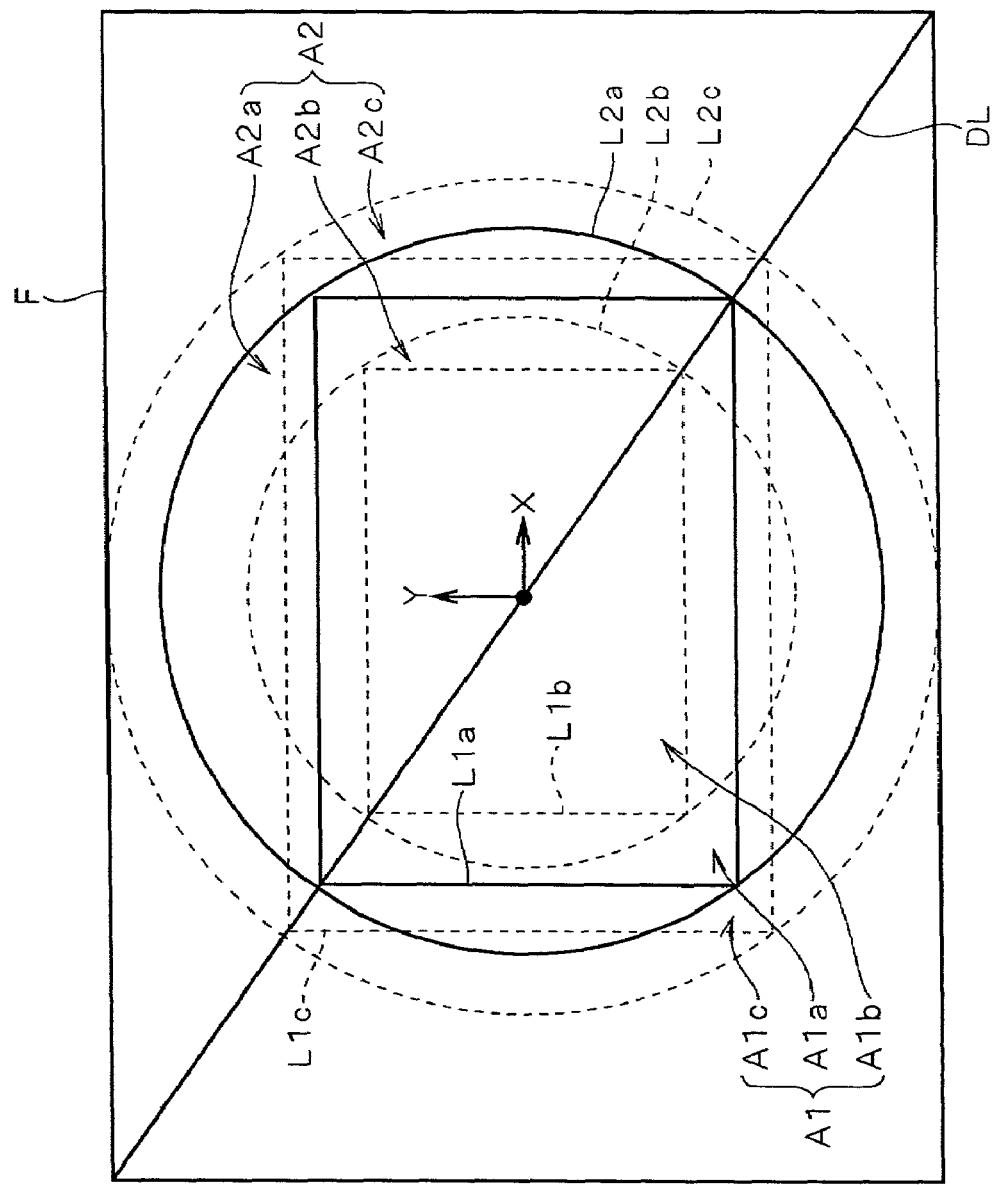
FIG. 27 is a view showing an example of a non-shading area in accordance with a focal length and an f-number at the time of exposure.

FIG. 27 is a view showing an example of the non-shading area A2 acquired in accordance with the focal length and the f-number at the time of exposure in the rectangular XY plane coordinate system in the captured image data F. As shown in FIG. 27, the boundary curves L2a to L2c of the non-shading area A2 is nearly circular centered at the center point of the captured image data. That is, the center side area of these boundary curves L2a to L2c is the non-shading area A2 and the peripheral side area thereof is the area influenced by a shading.

The area A2a surrounded by the solid line L2a in the drawing represents the non-shading area A2 acquired in the case of the captured image data captured in the initial condition of the digital camera 1. The initial condition of the digital camera means a condition that the focal length and the f-number of the imaging lens 3 are the initial values (values when the power is turned ON).

Furthermore, the areas A2b, A2c surrounded by the dotted lines L2b, L2c represent the non-shading area A2 acquired in the case of the captured image data captured with different focal length and f-number from the initial values. As described above, when the focal length and the f-number are varied from the initial values, the non-shading area A2 in which the area is varied for the area A2a is acquired. That is, the more the focal length tilts from the initial value to the wide side, the narrower the non-shading area A2 as is the area A2b, while on the other hand, the more the focal length tilts from the initial value to the tele side, the wider the non-shading area A2 as is the area A2c. Likewise, the smaller the f-number than the initial value, the narrower the non-shading area A as is the area A2b, while on the other hand, the larger the f-number, the wider the non-shading area A2 as is the area A2c.

After acquiring the non-shading area A2 corresponding to the focal length and the f-number as described above, the image synthesizer 159 sets the rectangular positioning area A1. This setting of positioning area A1 is achieved by setting two intersecting points between the boundary curves L2a to L2c of the non-shading area A2 and the diagonal line DL of the captured image data as the left top end point and the right bottom end point of the positioning area A1, respectively. Therefore, all pixel data of the set positioning area A1 is included in the non-shading area A2.

The area A1a surrounded by the solid line L1a shown in FIG. 27 represents the positioning area A1 set for the case of the captured image data captured in the initial condition of the digital camera 1. Furthermore, the areas A1b, A1c surrounded by the dotted lines L1b, L1c represents the positioning area A1 set for the captured image data captured after the focal length or the f-number has been changed from the initial value.

Since the positioning area A1 is set in accordance with the size of the non-shading area A2, when the focal length or the f-number is changed from the initial value, the positioning area A1 whose width is changed with respect to the area A1a in accordance with the change of the focal length or the f-number. That is, the more the focal length tilts to the wide side from the initial side, the narrower the positioning area A1 is set as is the area A1b, while on the other hand, the more the focal length tilts to the tele side from the initial value, the wider the positioning area A1 is set as is the area A1c. Likewise, the smaller the f-number than the initial value, the narrower the positioning area A1 is set as is the area A1b, while on the other hand, the larger the f-number than the initial value, the wider the positioning area A1 is set as is the area A1c.

In this connection, the non-shading area A2 in the case where of "the focal length is wide end" and "the f-number is open" is the narrowest among the non-shading areas A2 of any optical conditions of focal length and optical condition. That is, by setting so that the positioning area A1 is included in the non-shading area A2 in the case of "the focal length is wide end" and "the f-number is open", it will be necessarily included in the non-shading area A2 in any optical conditions. In other words, that positioning area A1 can be used in any optical conditions. Therefore, the area included in the non-shading area A2 in the case of "the focal length is wide end" and "the f-number is open" may be set as a fixed positioning area A1 without changing the positioning area A1 in accordance with the focal length and the f-number as described above.

By setting the positioning area A1 by way of such a process, the image synthesizer 159 can perform the positioning process of the first image F1 and the second image F2 using this positioning area A1 (step S89). This positioning process is the same process as step S123 of FIG. 23. And, a synthesis process of the first image F1 and the second image F2 (step S90) is performed. This synthesis process is as same as step S23 of FIG. 9.

Subsequently, as the synthesized image is generated, the shading corrector 160 performs a shading correction on the generated synthesized image (step S91). In this shading correction, the shading correction is performed using a correction coefficient corresponding to the movement amount by which the first image F1 and the second image F2 are relatively moved from the frame coincidence condition in the positioning process.

FIG. 28A shows curves each having a constant distribution of correction coefficients used for the shading correction in the case where the second image F2 is moved in the positioning process from the condition that frames of the first image F1 and the second image F2 coincide with each other before performing the positioning process. In the drawing, the moved second image F2 is denoted by the dotted line, the synthesized image F3 obtained by a synthesis process after the positioning process is denoted by the bold line.

In addition, the movement line L1 shown in FIG. 28A represents relative displacement between the respective centers of the first image F1 and the second image F2 in the image matching condition. The length of this movement line L1 represents a relative moving amount of the second image F2 on the basis of the frame coincidence condition of the first image F1 and the second image F2, and the position corresponding to ½ of the moving amount from the original center on the movement line L1 coincides with the center point of the synthesized image F3.

As shown in FIG. 28A, the curves in which distribution of correction coefficient is constant are nearly circular centered at the respective center points of the first image F1 and the second image F2. By the way, assuming the normal L2 to the movement line L1 at the center point of the synthesized image F3, the correction coefficients for the part of the synthesized image F3 are distributed symmetrically with respect to this normal L2. That is, the curves in which distribution of correction coefficients with respect to the synthesized image F3 is constant are nearly oval-like curves whose short diameter lies in the moving direction of the second image F2 as shown in FIG. 28B. By performing the shading correction using such correction coefficients, it is possible to perform the shading correction on the synthesized image.

By the way, a spatial distribution of correction coefficients used for the shading correction of the first image F1 or the second image F2 is represented by the function S (sqrt $(x^2+y^2)$) depending on the distance from the center point of the captured image data sqrt $(x^2+y^2)$ wherein "sqrt" represents square root. And in the case where the first image F1 and the second image F2 are addingly synthesized in the ratio of k:(1−k) (0<k<1), the correction coefficient used for the shading correction of the synthesized image F3 is preferably determined on the basis of the weighed mean value using the function S.

$$k \cdot S(r) + (1-k) \cdot S(r') \qquad \text{expression (A)}$$

provided that $r = \text{sqrt}(x^2+y^2)$;

$r' = \text{sqrt}\{(x-\delta x)^2 + (y-\delta y)^2\}$;

x, y represent coordinate variables in the rectangular XY plane coordinate system whose origin point is the center point of image of either one of the first image F1 and the second image F2; and δx, δy represent X, Y component values of conforming movement amount.

Subsequent steps S92 to S94 are as same as steps S72 to S74 of FIG. 16.

In the above description, the fifth preferred embodiment was explained, and in the present preferred embodiment, since the positioning area A1 is set in accordance with the influence of shading, it is possible to perform a positioning process without carrying out the shading correction.

It is to be noted that though the synthesized image is subjected to the shading correction in the present preferred embodiment, the shading correction may not be performed since the positioning process can be accurately carried out by setting the positioning area A1 in consideration of the influence of shading.

6. Other Preferred Embodiments

In the above preferred embodiment, the synthesized image that has been subjected to gradation control is obtained by capturing two images of different exposures for the same subject in different timings and synthesizing these two images in an appropriate adding ratio, however, the present invention is not limited to this. For example, such a process is also possible that a first image focused at the main subject and a second image focused at the background of the main subject are synthesized to obtain a desirably blurred synthesized image. Furthermore, such a process is also possible that a first image and a second image in which exposure positions for the subject are slightly different from each other, and a synthesized image having a higher resolution than the original images is acquired. That is, the present invention may be applicable to any processes insofar as they capture two images in different timing and synthesize these images.

While the invention has been shown and described in detail, the foregoing description is in all aspects illustrative and not restrictive. It is therefore understood that numerous modifications and variations can be devised without departing from the scope of the invention.

What is claimed is:

1. An image processing apparatus comprising:
   an image acquiring part for acquiring a first image and a second image;
   a position adjuster for specifying an area where an influence of shading is ignorable for each of said first image and said second image acquired by said image acquiring part, and performing a positioning of said first image and said second image contained in said area where an influence of shading is ignorable thus specified; and
   an image generator for generating a synthesized image of said first image and said second image that have been subjected to positioning by said position adjuster.

2. The image processing apparatus according to claim 1, wherein said first image and said second image each consist of a center side area and a peripheral side area, and
   said area where an influence of shading is ignorable is the center side areas of said first image and said second image.

3. The image processing apparatus according to claim 1, further comprising:
   an imaging lens of which focal length is variable,
   wherein said position adjuster changes an area to be used for positioning in accordance with the focal length of said imaging lens.

4. The image processing apparatus according to claim 3, wherein said position adjuster widens said area to be used for positioning as said focal length increases.

5. The image processing apparatus according to claim 1, further comprising:
   an imaging lens of which focal length is variable,
   wherein said position adjuster specifies the area in the case where the focal length of said imaging lens is a wide angle end as an area to be used for positioning.

6. The image processing apparatus according to claim 1 further comprising:
   an imaging lens of which f-number is variable,
   wherein said position adjuster changes the area to be used for positioning in accordance with an f-number of said imaging lens.

7. The image processing apparatus according to claim 6, wherein said position adjuster widens the area to be used for positioning as said f-number increases.

8. The image processing apparatus according to claim 1, further comprising:
an imaging lens of which f-number is variable,
wherein said position adjuster specifies the area in the case where the f-number of said imaging lens is open value as an area to be used for positioning.

9. A program embodied in a computer readable medium for executing an image processing, in which execution of said program by a computer allows said computer to execute the steps of:
acquiring a first image and a second image;
specifying an area where an influence of shading is ignorable for each of acquired said first image and said second image;
performing positioning of said first image and said second image included in said specified area where an influence of shading is ignorable; and
generating a synthesized image of said first image and said second image that have been subjected to positioning.

10. An image processing apparatus comprising:
an image acquiring part for acquiring a first image and a second image;
a position adjuster for performing positioning of said first image and said second image acquired in said image acquiring part;
an image generator for generating a synthesized image of said first image and said second image that have been subjected to positioning by said position adjuster; and
a shading corrector for performing a shading correction of said synthesized image using a shading correction coefficient in accordance with a relative amount of movement of said first image and said second image at a time of positioning by said position adjuster.

11. The image processing apparatus according to claim 10,
wherein curves each having a constant distribution of said shading correction coefficients of each of said first image and said second image are nearly circular curves; and
curves each having a constant distribution of said shading correction coefficients in accordance with the amount of movement are nearly oval curves each with a shorter diameter extending along the direction of movement.

12. The image processing apparatus according to claim 10,
wherein said image generator additively synthesizes said first image and said second image in a ratio of:
k:(1−k), provided that 0<k<1, and
said shading correction coefficient in accordance with the amount of movement is determined based on a weighed mean value using a predetermined function S as follows:

$k \cdot S(r) + (1-k) \cdot s(r')$, provided that $r = \mathrm{sqrt}(x^2 + y^2)$;

$r' = \mathrm{sqrt}\{(x-\delta x)^2 + (y-\delta y)^2\}$;

"sqrt" represents square root;
x, y represent coordinate variables in the rectangular XY plane coordinate system whose origin point is the center of image of either one of said first image and said second image; and δx, δy represent said amounts of movement in the X coordinate direction and the Y coordinate direction, respectively.

13. A program embodied in a computer readable medium for executing an image processing, in which execution of said program by a computer allows said computer to execute the steps of:
acquiring a first image and a second image;
performing positioning on acquired said first image and said second image;
generating a synthesized image of said first image and said second image that have been subjected to positioning; and
performing a shading correction on said synthesized image using a shading correction coefficient in accordance with a relative amount of movement of said first image and said second image at the time of positioning.

14. A program embodied in a computer readable medium for enabling an image processing, in which execution of said program by a computer allows said computer to execute the steps of:
acquiring a first image and a second image;
allowing a user to designate an area to be used for positioning of said first image and said second image;
performing a shading correction on each of acquired said first image and said second image only for said designated area to be used for positioning;
performing a positioning of said first image and said second image that have been subjected to the shading correction; and
generating a synthesized image of said first image and said second image that have been subjected to the positioning.

15. The program according to claim 14, in which execution of said program by said computer allows said computer to execute the further step of:
allowing a user to designate a correction table to be used for a shading correction in accordance with an apparatus by which said first image and said second image are acquired.

16. An image processing apparatus comprising:
a memory for storing a first image and a second image;
a manual member for designating an area to be used for positioning of said first image and said second image stored in said memory;
a shading corrector for performing a shading correction on each of said first image and said second image only for said designated area to be used for positioning;
an adjuster for performing a positioning of said first image and said second image that have been subjected to the shading correction by said shading corrector; and
an image generator for generating a synthesized image of said first image and said second image that have been subjected to the positioning by said adjuster.

17. A program embodied in a computer readable medium for enabling an image processing, in which execution of said program by a computer allows said computer to execute the steps of:
acquiring a first image and a second image;
allowing a user to designate an area to be used for positioning of said first image and said second image;
determining whether or not it is necessary to perform a shading correction on said area designated by said user to be used for positioning;
when it is determined that a shading correction is necessary, performing a shading correction on each of acquired said first image and said second image;

performing a positioning of said first image and said second image that have been subjected to the shading correction; and generating a synthesized image of said first image and said second image that have been subjected to the positioning.

18. The program according to claim 17, in which execution of said program by said computer allows said computer to execute the further step of:

allowing a user to designate a correction table to be used for a shading correction in accordance with an apparatus by which said first image and said second image are acquired.

19. An image processing apparatus comprising:

a memory for storing a first image and a second image;

a manual member for designating an area to be used for positioning of said first image and said second image stored in said memory;

a discriminator for determining whether or not it is necessary to perform a shading correction on said area designated by said manual member to be used for positioning;

a shading corrector for performing a shading correction on each of said first image and said second image when said discriminator determines that a shading correction is necessary;

an adjuster for performing a positioning of said first image and said second image that have been subjected to the shading correction by said shading corrector; and an image generator for generating a synthesized image of said first image and said second image that have been subjected to the positioning by said adjuster.

20. A program embodied in a computer readable medium for enabling an image processing, in which execution of said program by a computer allows said computer to execute the steps of:

(a) acquiring a first image and a second image;

(b) determining whether information relating to exposure condition associated with each of said first image and said second image is acquirable;

(c) performing a shading correction on each of said first image and said second image on the basis of said information;

(d) performing a positioning of said first image and said second image that have been subjected to the shading correction in said step (c);

(e) generating a synthesized image of said first image and said second image that have been subjected to the positioning in said step (d);

(f) reducing an area to be used for positioning of said first image and said second image;

(g) performing a positioning of said first image and said second image that have been subjected to said step (f); and (h) generating a synthesized image of said first image and said second image that have been subjected to the positioning in said step (g);

wherein said steps (c) through (e) are performed when said information is acquired, and wherein said steps (f) through (h) are performed when said information is not acquired.

21. An image processing apparatus comprising:

a memory for storing a first image and a second image;

a discriminator for determining whether information relating to exposure condition associated with each of said first image and said second image is acquirable;

a shading corrector for performing a shading correction on each of said first image and said second image on the basis of said information;

a first adjuster for performing a positioning of said first image and said second image that have been subjected to the shading correction by said shading corrector;

a first image generator for generating a synthesized image of said first image and said second image that have been subjected to the positioning by said first adjuster;

a second adjuster for reducing an area to be used for positioning of said first image and said second image, and for performing a positioning of said first image and said second image each including the reduced area; and a second image generator for generating a synthesized image of said first image and said second image that have been subjected to the positioning by said second adjuster;

wherein said shading corrector, said first adjuster and said first image generator are used when said information is acquired, and wherein second adjuster and said second image generator are used when said information is not acquired.

* * * * *